(12) United States Patent
Wetherall et al.

(10) Patent No.: US 11,610,007 B2
(45) Date of Patent: *Mar. 21, 2023

(54) APPLICATION OF SECURITY PARAMETERS FOR CONTENT

(71) Applicant: Hyland UK Operations Limited, Maidenhead (GB)

(72) Inventors: Roy Wetherall, Sydney (AU); Shane Maciak, Maidenhead (GB); John Iball, Maidenhead (GB)

(73) Assignee: Hyland UK Operations Limited, Maidenhead (GB)

( * ) Notice: Subject to any disclaimer, the term of this patent is extended or adjusted under 35 U.S.C. 154(b) by 237 days.

This patent is subject to a terminal disclaimer.

(21) Appl. No.: 16/892,211

(22) Filed: Jun. 3, 2020

(65) Prior Publication Data

US 2020/0293669 A1 Sep. 17, 2020

Related U.S. Application Data

(63) Continuation of application No. 15/423,521, filed on Feb. 2, 2017, now Pat. No. 10,713,368.

(51) Int. Cl.
*G06F 21/00* (2013.01)
*G06F 21/60* (2013.01)
(Continued)

(52) U.S. Cl.
CPC .......... *G06F 21/604* (2013.01); *G06F 3/0482* (2013.01); *G06F 3/04847* (2013.01);
(Continued)

(58) Field of Classification Search
CPC ................. G06F 21/604; G06F 3/0482; G06F 3/04847; G06F 16/219; G06F 21/6218;
(Continued)

(56) References Cited

U.S. PATENT DOCUMENTS

| 8,464,161 | B2 * | 6/2013 | Giles | G06F 21/604 |
| | | | | 715/751 |
| 8,555,403 | B1 * | 10/2013 | Kilday | G06F 21/62 |
| | | | | 709/229 |
| 8,898,730 | B1 | 11/2014 | Fredinburg et al. | |
| 9,003,295 | B2 | 4/2015 | Baschy | |
| 2004/0239700 | A1 * | 12/2004 | Baschy | G06F 21/62 |
| | | | | 715/781 |
| 2005/0097595 | A1 * | 5/2005 | Lipsanen | H04N 7/163 |
| | | | | 725/25 |

(Continued)

*Primary Examiner* — Joseph P Hirl
*Assistant Examiner* — Ka Shan Choy
(74) *Attorney, Agent, or Firm* — Mintz, Levin, Cohn, Ferris, Glovsky and Popeo, P.C.; F. Jason Far-hadian, Esq.

(57) ABSTRACT

Computer-implemented systems, method and products configured for providing one or more restriction groups in a content management system are provided. One or more restriction marks may be associated with the one or more restriction groups. At least a first restriction mark may be associated with a first restriction group. The first restriction mark may be assigned to a first content item stored in the content management system, in response to determining that the first content is associated with the first restriction group, the first content item being associated with metadata indicating user access permissions according to the first restriction mark and a security classification. The metadata associated with the first content item may be updated based on the assignment of the first restriction mark to the first content item to allow or limit user access to the first content item.

20 Claims, 18 Drawing Sheets

(51) Int. Cl.
*G06F 21/62* (2013.01)
*G06Q 10/10* (2023.01)
*G06F 3/04847* (2022.01)
*G06F 3/0482* (2013.01)
*G06F 16/21* (2019.01)
*H04L 9/40* (2022.01)

(52) U.S. Cl.
CPC ........ *G06F 16/219* (2019.01); *G06F 21/6218* (2013.01); *G06Q 10/10* (2013.01); *G06F 2221/2141* (2013.01); *H04L 63/105* (2013.01)

(58) Field of Classification Search
CPC ............ G06F 2221/2141; G06Q 10/10; H04L 63/105
See application file for complete search history.

(56) References Cited

U.S. PATENT DOCUMENTS

| | | | |
|---|---|---|---|
| 2006/0117247 A1 | 6/2006 | Fite et al. | |
| 2008/0288914 A1 | 11/2008 | Schmitter | |
| 2010/0262577 A1* | 10/2010 | Pulfer | G06F 21/6209 707/E17.008 |
| 2011/0265188 A1* | 10/2011 | Ramaswamy | G06F 3/048 715/764 |
| 2012/0331568 A1* | 12/2012 | Weinstein | H04L 12/185 726/29 |
| 2014/0013433 A1* | 1/2014 | Turner | G06F 21/604 726/23 |
| 2015/0281246 A1 | 10/2015 | Lewis et al. | |
| 2016/0110374 A1 | 4/2016 | Wetherall et al. | |
| 2017/0374079 A1 | 12/2017 | Labunets et al. | |

* cited by examiner

APPLICATION OF SECURITY PARAMETERS FOR CONTENT

CROSS-REFERENCE TO RELATED APPLICATIONS

The present Application is a continuation of, and claims priority to, U.S. patent application Ser. No. 15/423,521, filed on Feb. 2, 2017, the content of which is incorporated herein by reference in entirety.

Any amendments, characterizations, or other assertions previously made in any related patent applications or patents (including any continuation or continuation-in-part applications or any parent, sibling, or child applications) with respect to any art, prior or otherwise, should not be construed as a disclaimer of any subject matter supported by the disclosure made in the present application. Applicant hereby rescinds and retracts any disclaimers whatsoever made in any related applications or patents during prosecution or otherwise. Applicant also respectfully submits that any prior art considered in any related patent applications or patents may need to be re-visited and reconsidered as to relevance and applicability to the subject matter disclosed herein.

TECHNICAL FIELD

The subject matter described herein relates to management of online records and/or content.

BACKGROUND

Records management (RM) generally refers to approaches to controlling and governing key records of an organization (e.g. an enterprise, a company, a university, or the like, including subordinate organizations within other organization) throughout the lifecycle of a record, which includes the period from when a record is first created by or provided to an organization to the eventual disposal of the record. Elements of records management can include identifying, classifying, prioritizing, storing, securing, archiving, preserving, retrieving, tracking, and destroying of records. These activities are typically part of a broader set of requirements associated with governance, risk, and compliance (GRC) activities performed by the organization, and are generally related to maintaining and securing records and evidence of the organization's business activities, etc. as well as the reduction or mitigation of risk that may be associated with such evidence.

Records management can be a crucial function within an organization, but also one that can be difficult to implement due to added burdens placed on users by requirements for compliance with records management protocols. Well-implemented approaches to records management can provide benefits such as improving efficiency and productivity, ensuring regulatory compliance, minimizing litigation risks, safeguarding important (or even vital) information, supporting improved decision making by an organization's management, preserving the organization's institutional memory, fostering improved document organization, etc. However, these benefits can be difficult to achieve for various reasons, including the reliance of many aspects of existing records management approaches upon a certain level of training, adoption, and regular implementation of a set of records management procedures by users at the organization. If users do not properly adopt and implement the necessary procedures, a records management approach can fail to achieve the various goals and to provide the intended benefits. Alternatively, hard enforcement of records management procedures in a manner that ensures compliance but that requires additional user actions beyond normal day to day work can hinder productivity as users are required to carry extra workload, and thereby devote time and attention to these extra tasks that could be more productively used for other tasks, simply to comply with such procedures.

Once a record is created, one or more of an owner of the record, a records repository, an authorized user, a records management team member, or the like can set records controls to regulate access to and distribution of the record. Records controls, as referred to herein, can include one or more records management policies, procedures, rules, etc., which can pertain to access privileges, records lifecycle management, and the like. For example, privileges can be set (e.g. by an administrator, manager, etc.) on a repository to allow users having certain roles to access particular records stored in the repository. Lifecycle management, records management, or other software-based architectures can be used to identify original records, versions of records, copies of records, and distribution histories of records. Records maintenance can be accomplished by formally and discretely identifying records (e.g. by coding and storing records in folders or other file plan hierarchies specifically designed for protection and storage capacity, by informally identifying and filing without indexing, or by other approaches.

Content management is a related field to records management. However, the two approaches are not always compatible and are sometimes at odds with one another. A content management system (CMS), otherwise known as a records management system, suitable for managing the various content items that an organization produces or receives, retains or otherwise stores, manipulates or modifies, etc. can support the requirements of one or more applications, and optionally other requirements, to provide a coherent solution in which content and management processes are capable of accessing content across a variety of applications subject to access controls, permissions, and the like. Content items managed by a content management system can include one or more of files, documents, images, photos, Web pages, records, XML documents, other unstructured or semi-structured files, etc., as well as directory structures such as folders, file trees, file plans, or the like, which can provide organization for multiple content items in addition to storing or otherwise representing relationships between content items, etc. For simplicity, the term "document" is used generically herein to refer to all types of content items handled by a content management system, while "record" refers to a content item that has been put under the control of a records management system.

A content management system can manage one or more of the actual digital content of a document, the metadata that describes a context of the document, associations between the document and other content or documents, a place and classification of the document in a repository, indexes for finding and accessing documents, etc. The content management system can also manage processes and lifecycles of documents to ensure that this information is correct. The content management system can also manage one or more workflows for capturing, manipulating, editing, storing, and distributing documents, as well as the lifecycle for how long a document will be retained and what happens after that retention period.

A content management system for use in enterprise content management can include one or more of document management tools, applications, and interfaces to support general office work, search, and discovery. Workflow management capabilities of a content management system can support various business processes, optionally including, but not limited to, case management and review and approval. Collaboration applications and services of a content management system can support the collaborative development of information and knowledge in the creation and refinement of content and documents. Web content management services of a content management system, which can be scalable, can support the delivery and deployment of content and documents from the enterprise to users (e.g. end users of content, customers of the enterprise, etc.). Records management capabilities of a content management system can capture and preserve records based upon government-approved or other standards. A standards-based platform can also provide access to applications that use these standards, such as publishing, image management, email management, etc.

Accurate classification of content items, for both security and other reasons, can be critical to ensuring that correct management policies are applied. Streamlining of the user input process for assigning security classifications and/or access controls to a large number of content items in a content management and/or records management system can dramatically improve uniform application of these important protocols. In systems in which application of classifications is a manual process relying on the knowledge of individuals, in particular for security sensitive information, it is generally a laborious, inefficient process. Very large numbers of files can require classification, in particular in government environments, and this volume can require very large numbers of users (100,000 in some organizations) spending large amounts of time in setting classifications. Simplification of the classification process can provide significant savings in time and effort. Existing systems that require multiple, time consuming entries as part of a classification process can lead to files being assigned a simple, higher "safe" level of classification, which can restrict access unnecessarily. Implementations of the current subject matter can reduce the frequency and/or likelihood of such "over-securing" occurring by improving the ease with which users can select a correct combination of security markings for a given file or group of content items.

SUMMARY

Implementations of the current subject matter can include features relating to improvements to processes for applying security labels and/or other user permissions sets to content items in a content management and/or records management system.

Computer-implemented systems, method and products configured for providing one or more restriction groups in a content management system are provided. One or more restriction marks may be associated with the one or more restriction groups. At least a first restriction mark may be associated with a first restriction group. The first restriction mark may be assigned to a first content item stored in the content management system, in response to determining that the first content is associated with the first restriction group, the first content item being associated with metadata indicating user access permissions according to the first restriction mark and a security classification. The metadata associated with the first content item may be updated based on the assignment of the first restriction mark to the first content item to allow or limit user access to the first content item; and the metadata associated with the first content item may be updated to further allow or limit user access to the first content item, in response to determining that the security classification is updated.

In one aspect, a method includes receiving a selection of one or more restriction groups through a graphical user interface on a display device associated with a content management system and displaying one or more restriction marks associated with the one or more restriction groups on the graphical user interface. A selection of the displayed one or more restriction marks is received through the graphical user interface for being assigned to a content item stored in the records management system The content item includes associated metadata stored in the content management system. The method further includes updating metadata associated with the content item. The updated metadata indicates that the selection of the one or more restriction marks is assigned to the content item.

In some variations, one or more of the following features can optionally be included in any feasible combination. It will be understood the following descriptions are of optional features, which should only be limiting on the claim scope to the extent that they appear in a claim.

Metadata associated with the content item can be updated. The updated metadata can indicate that the selection of the one or more restriction marks is assigned to the content item. A selection can be received of the one or more restriction marks for assigning to a user of the records management system. The selection can be through the graphical user interface. The content item can be managed by the records management system. A profile associated with the user can be updated. The profile associated with the user can be updated to include the one or more restriction marks. In some variations, the one or more restriction groups includes a nationality group, the nationality group including one or more nationality restriction marks.

A request can be received, at the content management system and from the user, to access the content item. The one or more restriction marks indicated in the metadata associated with the content item can be compared with the one or more restriction marks in the profile of the user. The user can be granted access to the content item in response to the comparing revealing that the one or more restriction marks in the profile of the user satisfy the one or more restriction marks in the metadata associated with the content item. In some variations, a selection can be received of a plurality of users of the content management system. The selection can be received through the graphical user interface on the display device. A selection of one or more restriction marks can be received through the graphical user interface on the display. The one or more restriction marks can be assigned to the selection of the plurality of users. A selection of a restriction classification of a set of restriction classifications can be received through the graphical user interface on the display device. The selected restriction classifications can be assigned to the content item stored in the content management system.

In some variations, a selection of a restriction classification of a set of restriction classifications can be received. A profile of the user can be updated, by the content management system, to include the selected security classification, the profile of the user being stored in a database associated with the records management system.

A selection of a set of restriction marks to assign to a project restriction group can be received through the graphical user interface presented on the display device. A selection of one or more content items managed by the records management system can be received for assigning to the project restriction group. The metadata being stored in a content repository of the records management system can be updated by the records management system. The metadata associated with the selected one or more content items can include an indication of the project restriction group. A selection of a project restriction group can be received through the graphical user interface presented on the display device. The project restriction group can be applied to the user. Access can be granted to the user, through the records management system, to the one or more content items with metadata having an indication of the project restriction group in response to the project restriction group being applied to the user.

In some variations, the one or more content items with metadata indicating that the user does not have a required access to the one or more content items can be hidden from the user.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to a content resource management system, an enterprise resource software system, or other business software solution or architecture, it should be readily understood that such features are not intended to be limiting.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
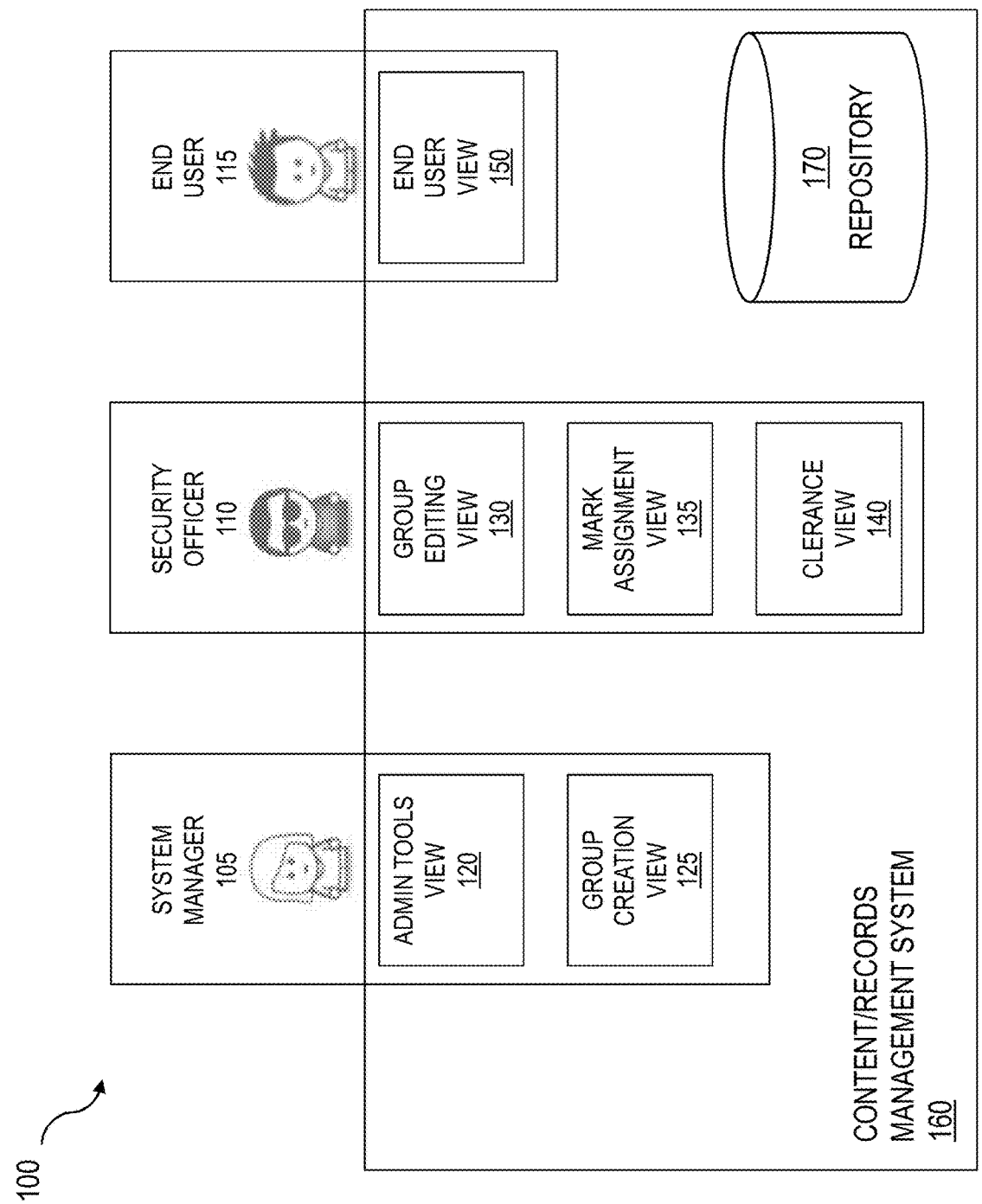
FIG. 1 shows a diagram illustrating features and functionality consistent with implementations of the current subject matter.

Implementations of the current subject matter can include user interface features that support streamlined setting and editing of security classifications and security markings (which can also be referred to as "restrictions") for content items (which can include one or more of files, documents, data, metadata, or the like) stored in a content management system, a records management system, or the like. As described in more detail below, user interface features consistent with implementations of the current subject matter can provide a holistic view of the options available such that a set of commonly used combinations and collections of markings is made available for rapid application by users in the form of restriction groups, which can be applied rapidly and efficiently to users, groups of users, subsets of users of groups, content items, groups of content items, folders or other file structure hierarchy elements, etc. by users of the content or records management system having appropriate security and/or access permissions.

In currently available online content management and records management approaches, restrictions (e.g. security classifications, classification guides, other caveats, etc.) are generally set independently with each assignment of a restriction to content item requiring a specific selection of the content item and a necessary restriction.

End users (e.g. military personnel or others who deal with content that may require specific security access protocols) may be required to classify files with the same or similar combinations of restrictions. Enabling identification of collections of common combinations of restrictions consistent with implementations of the current subject matter can allow such users to apply any relevant, related restriction markings for a given content item or user (or more than one of either) with a single click. Improved ease of application of restriction markings can improve not only efficiency but also accuracy of the application of content item security as users will tend to mark users and content items with a higher than necessary and more restrictive restriction marking out of caution "fail safe" rather than consider and select all the possible restriction markings to select an appropriate, only as restrictive as necessary, level of security.

When a content item is initially created or loaded into an electronic content management system and/or an electronic records management system, it generally must be classified according to pre-defined security specifications (e.g. DOD5015.02 for U.S. military-related content). Such a classification may require the setting of a clearance level (e.g. Top Secret), any metadata associated with the classification (e.g. classification guides) and, optionally, one or more supplemental security markings or caveats that further restrict access (e.g. a NOFORN or "no foreign" marking, which would prevent any non-native such as a non-citizen from accessing the content regardless of their security clearance level). A single classification may have one clearance level, one or more classification guide entries, and one or more other caveats. As noted above, the term "restriction" or "restriction marking" is used generically to refer to the designation or designations that can be assigned to a user or a content item and that need to be satisfied for a user to have full access to a content item. This aspect of the current subject matter is described in further detail below.

As noted above, implementations of the current subject matter can include user interface approaches and storage strategies for data and metadata that enable a properly authorized user to select a content item or a group of content items and/or a user or group of users and apply commonly used combinations of restrictions by selecting pre-defined collections of these parameters, which are generally referred to as "restriction groups." When initially classifying content items, a properly authorized user can select one of a group of predefined (e.g. common) collections of restriction markings. For example, in a user interface, all of the individual restriction markings available can be displayed with the restriction markings associated with the selected collection highlighted. The user can then confirm the selection of restriction markings or edit any of the items to allow customization of security settings beyond what is defined in a collection.

Implementations of the current subject matter can readily replace paper based security protocol approaches. Additional benefits can include significant usability improvements relative to other electronic systems that require the individual setting of potentially multiple required restriction markings to individual content items, users, or groups of the same. Inclusion of collections of common combinations of restriction markings can allow for easy initial classification and the ability to display all the current restriction markings in one view for easy editing.

Any organization (e.g. a company, a department, a government agency, a military organization, a defense contractor, etc.) that manages content items that include varying levels of security clearance or other access permissions may benefit from the current subject matter. In particular, such organizations can include those handling security classified content as well as organizations dealing with any system of classification or security restrictions that includes many individual attributes that need to be selected to apply the classification or security restrictions and in which significant numbers of contents items and/or users may be classified using a same core set of restrictions with occasional small changes. User adoption of records management solutions and/or content management solutions can be critical in a successful deployment of such systems. The setting and editing of security classifications can be a key element in the usability of such systems, so anything that eases this process can improve user adoption.

For clarity, the descriptions provided herein generally refer to user interface views in the singular. However, the functionality referred to as being part of a single user interface view can also, within the scope of the current subject matter, alternatively be presented in more than one view. For example, a first subset of functionality described as being part of a user interface view can be provided within a first view while a second subset of functionality described as being part of that user interface view can be provided with a second view. Likewise, the discussion herein of examples in which certain first and second functionality features are presented on different user interface views does not preclude such first and second functionality features from instead being presented within a single user interface view.

FIG. 1 shows a diagram 100 illustrating various features consistent with implementations of the current subject matter, in particular relating to interaction of different users of a content management and/or records management system with various user interface views that can be provided to handle content item access as well as managing of restrictions and other security protocols for the content items managed. The process diagram 100 and the following descriptions relate to various interactions between a system manager 105, a security officer 110, and an end user 115 and user interface views that can be provided by a method or a tangible embodiment (e.g. one or more computing systems and/or any form of computer instructions for implementing features of such a method) consistent with the current subject matter. The system manager 105 can be one or more users with administrative permissions for handling records and aspects of records in a records management system, such as for example a records manager of a records management system, one or more system administrators of a content management system, etc., or the like. A security officer 110 may be a government official, a military officer, a corporate security manager, or some other user with appropriate security clearance or other authorization to determine how content items are to be classified and what restrictions should be applied to content items to control access by users to such content items. It will be readily understood that the roles of system manager 105 and security officer 110 for an organization may optionally be filled by a same person or group of persons.

The system manager 105 can navigate to an "administration tools" user interface view 120, which can optionally include tools for managing features and operations of one or more of a content management system, a records management. The administration tools user interface view 120 can in turn allow the system manager 105 to navigate to a group creation user interface view 125 supporting generation or creation of restriction groups to which one or more combination of two or more restriction marks into groupings that are referred to herein as restriction groups. For adding a new restriction group, the system manager 105 can be prompted to enter a name for the new restriction group. Permissions to undertake further modification of a new restriction group and/or to modify an existing restriction group can be limited to the security office 110 or someone of comparable permission level (e.g. clearance level, security clearance level, classification level, etc.).

A restriction group editing user interface view 130 can include options for editing newly created and/or existing restriction groups, which can include adding or deleting marks from a given restriction group, deleting an existing restriction group, etc. As assignment of restriction marks to a given restriction group requires knowledge of and attention to the various security or other restrictions (e.g. permissions, clearances, classifications, etc.) that may be applicable to a user or a content item, use of the restriction group editing user interface view 130 can be limited to only the security officer 110 or some other individual(s) having sufficient access permissions to modify how content items and users are restricted according to whatever protocols are in place for the organization using the content management and/or records management system that employs features consistent with implementations of the current subject matter. The restriction group editing user interface view 130 can prompt the security office 110 to add or delete one or more restriction marks to a restriction group.

A restriction mark can include associated metadata or other information indicative of what types of controls are to be placed on content items to which the restriction mark is assigned. For example, the restriction mark can indicate how to handle issues such as access by non-users of the content management or records management system (e.g. persons who do not have log-in credentials for access to the content management or records management system, but may be provided limited user rights via a "cloud" portal, a collaboration site, or the like), a level of access to be granted to users who are not granted full access to content items having the restriction mark, etc.

The level of access can include one of "no access" or "discoverable only" or other possible options. No access would mean that a user or other person with such a designation is not allowed to even see that the content item exists. For example, the content item may be hidden from appearing in search results despite matching query criteria or search terms, etc. or may be invisible when a user navigates to a folder or other file structure including such a content item for which the user lacks the proper restriction mark. Discoverable only can mean that the content item may appear as a result of a search or within a folder that a user navigates to, but the user lacking the proper restriction mark for accessing the content item would not be able to open, download, or perform any other actions on the content item. In some examples, a discoverable only file can appear in the user interface as greyed out or otherwise non-selectable. In other words, while a user viewing a set of search results or browsing to a folder or other organizational structure that includes a content item for which the user does not have the appropriate restriction mark or marks but which has a "discoverable only" setting, the presence of the content item is not hidden from the user, but no other actions can be taken by the user on the content item.

The security officer 110 can also access a restriction mark management view 135 that enable selection or other confirmation or designation of the types of document library elements that will allow a given restriction mark to be applied. In other words, the security officer 110 can be presented with the restriction mark management user interface 135 view via which he or she can define and/or manage the meaning of various restriction marks, determine what types of restriction marks belong together (or, for example, are typically applied together) For example, the security officer 110 can select whether the restriction mark can be applied at a content item level (e.g. on a content item by content item basis), at a folder or other directory level, to content items or records only, etc.).

When a restriction mark can be applied at a higher hierarchy level than file by file, the restriction mark generally applies to all children nodes within a parent node of the hierarchy to which the assigned restriction mark is applied. However, it is not outside the scope of the current subject matter to allow for a security officer 110 to designate, for example via the mark management user interface view 135 that a restriction mark does not propagate to lower levels of the hierarchy. Parent and child nodes in a hierarchy refer to superior and subordinate organization structures. For example, a first folder that is organized within a second folder would be a child node in the hierarchy to the parent of the second folder. Content items that are organized in a folder are child nodes (or children) of the folder that contains them, which can in turn be a child to another (parent) folder that contains it.

In addition to defining security marks, the security officer 110 can also, via a mark assignment user interface view 135 or, alternatively, via another user interface view, assign restriction marks to a user, a group of users, a subset of a group of users, etc. In general, a user having a given restriction mark can view content items having that restriction mark. The aforementioned controls on content item access (e.g. no access, discoverable only, etc.) can be enforced via a comparison of a user's restriction mark (or security marks) with the restriction mark or marks assigned to a content item in question. If the user lacks a restriction mark for full access to a content item, the restriction mark can also, as noted above, define what, if any, access the user can have to that content item.

A clearance user interface view 140 can support filtered group searches, which can for example allow the security officer 110 to search for a one or more users, either by their inclusion in a given restriction group (e.g. all users assigned to that restriction group) or by other criteria. Via such a view, the security officer 110 can also search for specific user names, and/or search for user using other metadata (such as for example date of hire; demographic information such as age, nationality, length of time at the organization, role within the organization, etc. Once a set of (one or more) users has been identified via the clearance user interface view 140, the security office 110 can add, modify, delete, etc. one or more restriction groups to which the set of users is assigned.

The end user 115 can interact with content items and file hierarchy structures via an end user content/records management user interface view 150 (also referred to as the "end user view" 150) the and need not be aware of any underlying restriction marks and/or restriction groups. In other words, content items and/or file hierarchy structures made available to the end user 115 can be controlled via a check or comparison of any restriction marks or restriction groupings applied to the end user and a content item or file hierarchy structure that might otherwise be provided to the end user 115. The end user can use the end user view 150 to navigate to or within and/or select a site (e.g. a collaboration site or the like containing some subset of the content items retained in the entire content management system), a document library, a folder, some other file hierarchy structure, etc. or to a specific content item.

An end user 115 can be provided with one or more user interface functions that allow the end user to label content items (or file hierarchy structures) with an existing restriction mark or restriction group. For example, a typical content management or records management user interface can include functionality, such as a check box, a pulldown menu, one or more keyboard commands, or the like, to enable a user to add restriction marks or restriction groups to a content item or file hierarchy structure. In general, a user may be allowed to add restriction marks and/or restriction groups to content that meets the criteria of a) being accessible to the user (e.g. because of a match between any restriction marks assigned to the user and any restriction marks assigned to the content item or file hierarchy structure and b) being compatible with a permissions level of the user with regards to editing metadata and security markings. In other words, an end user 115 can make edits to the restriction marks and/or restriction groups assigned to a given content item only if the end user is properly authorized to access the content item. In some implementations of the current subject matter, the content item can include restrictions that prevent an end user lacking some higher level of clearance or other access from being able to edit restriction marks and/or restriction groups assigned to the content item.

FIG. 1 further shows that the various user interface views described above are generated by operation of a records or content management system 160. As noted above, it will be understood that the various user interface features described above and in further detail below can be included in a system providing features of either or both of content management and records management. The system 160, which includes at least one computing system implemented on computing hardware (e.g. including a programmable processor or the like and a memory or the like). The system 160 includes a repository 170, in which content items are retained according to some file hierarchy structure. In the context of a content management system, such content items may be documents, files, or any other piece of content. In a records management system, these same content items are typically referred as records to indicate that some record-keeping control has been placed upon them, for example as described in co-pending and co-owned application publication no. 2016/0110374A1, the disclosure of which is incorporated herein by reference.

Figure 2:
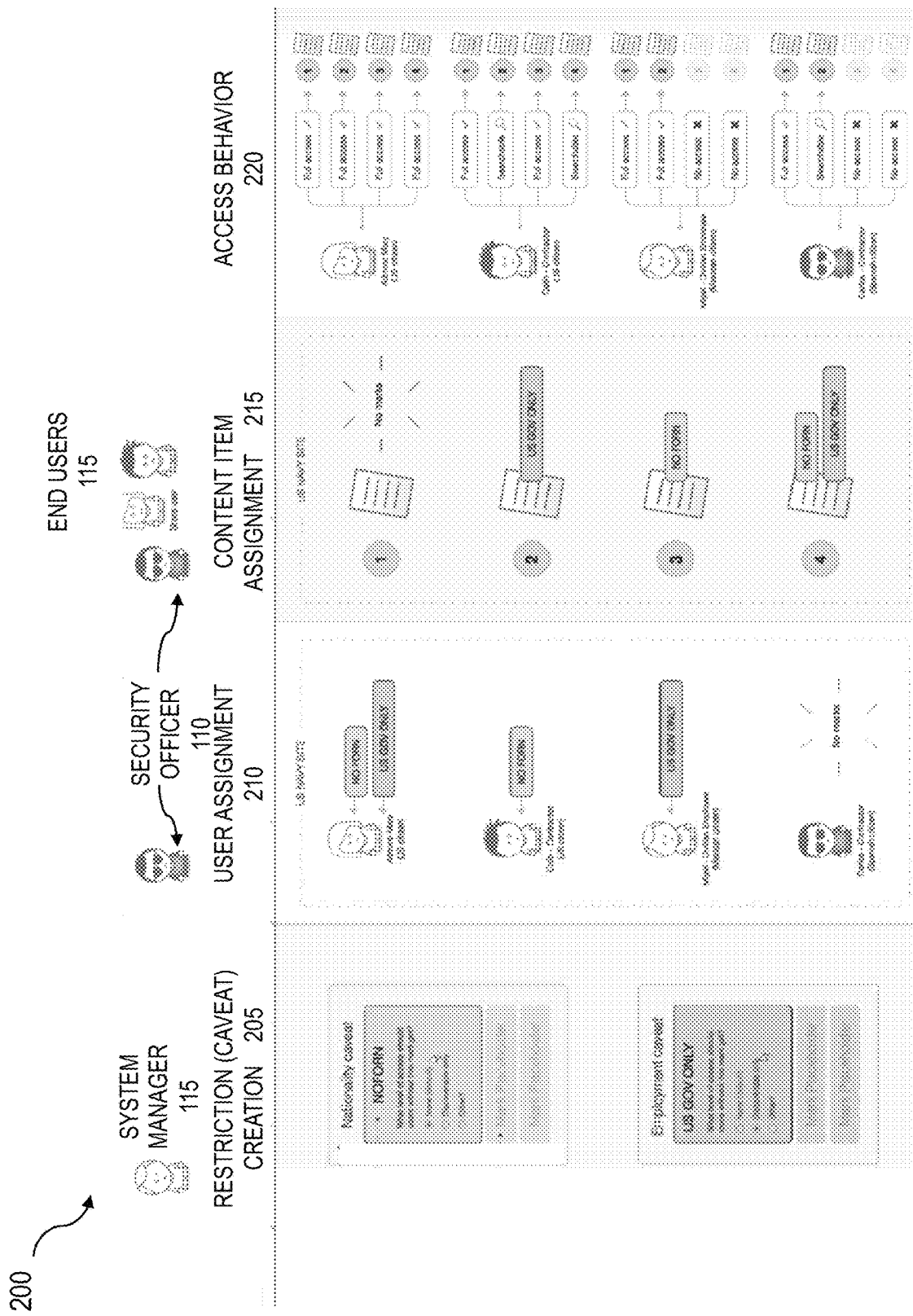
FIG. 2 and FIG. 3 show user interface view concept diagrams consistent with implementations of the current subject matter.
Figure 3:
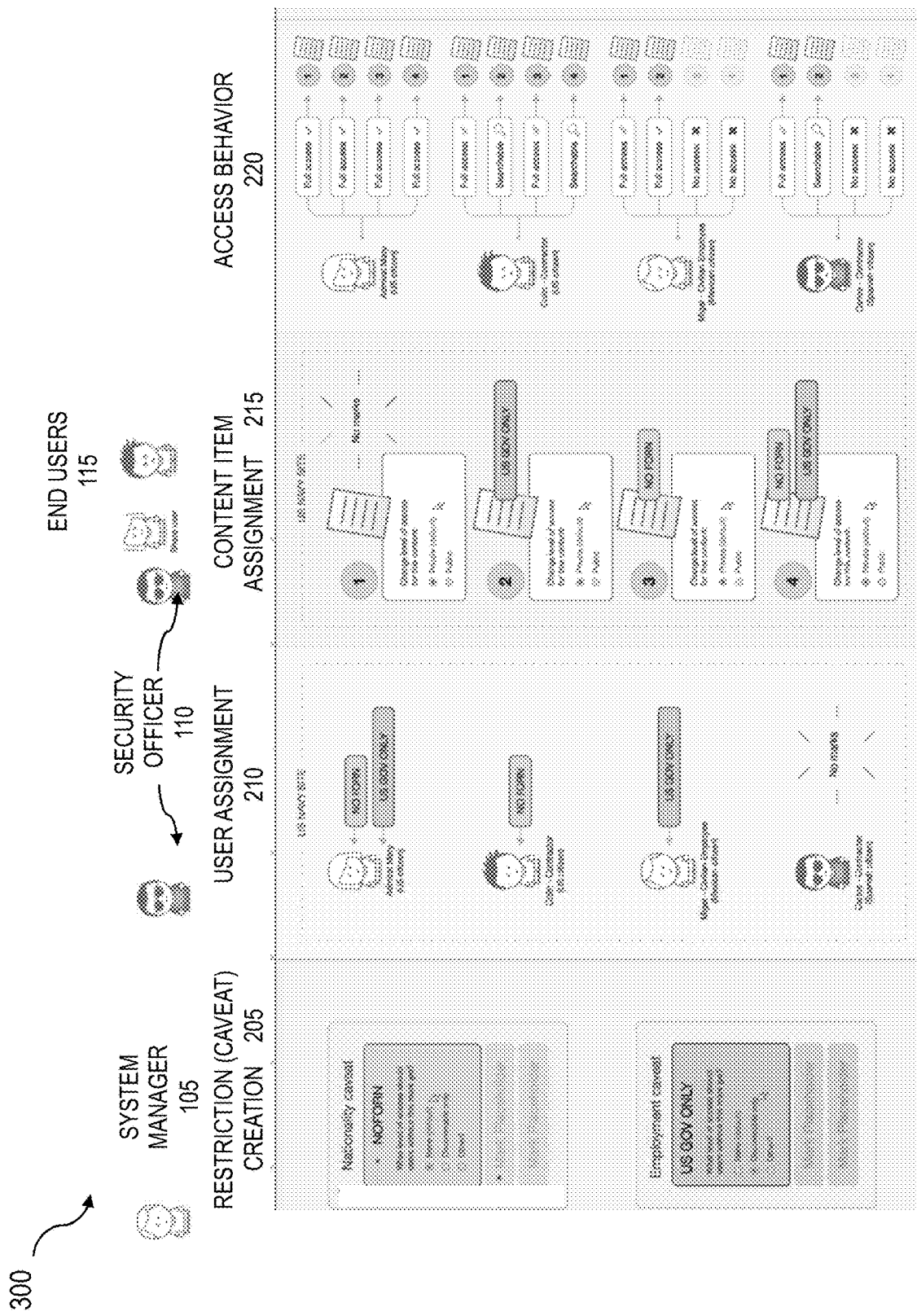

FIG. 2 and FIG. 3 show user interface view concept diagrams 200, 300 illustrating features of an example user interface consistent with implementations of the current subject matter as it applies to different classes of users at an organization. The views 200 and 300 illustrate features relating to the behavior of restriction marks in general and in some parts of the example to caveat marks, which are a type of restriction mark that indicates further security caveats that can be applied to a user and/or a content item or file hierarchy structure on top of more traditional security or clearance markings.

As shown, the diagram 200 of FIG. 2 divides features among an administrator (e.g. a system manager 105 as discussed above) role, a security officer role, and a user (e.g. an end user 115 as discussed above) role. The system manager 105 can be enabled to create caveats (and other restrictions) as discussed above, while the security officer 110 can assign one or more of the defined caveats to each of one or more users of the repository. In the examples of FIG. 2 and FIG. 3, the caveats are "no foreign" (e.g. NOFORN) and "U.S. Government Only" (US GOV ONLY). It will be understood that other caveats and/or restriction marks can also be included or applied consistent with implementations of the current subject matter.

FIG. 2 shows an example using caveats only, while FIG. 3 allows caveats to be assigned to content items as well as "marks," which allow a user to assign further security or access limits, such as for example public or private, to content items. The definitions of the caveats and/or restriction marks are implemented as access controls (see the far right of FIG. 2 and FIG. 3) such that access to a given content item for a given user is dependent on both that given content item's allocation among caveats (and optionally marks) and also that given user's allocation of one or more caveat or restriction marks.

Figure 4:
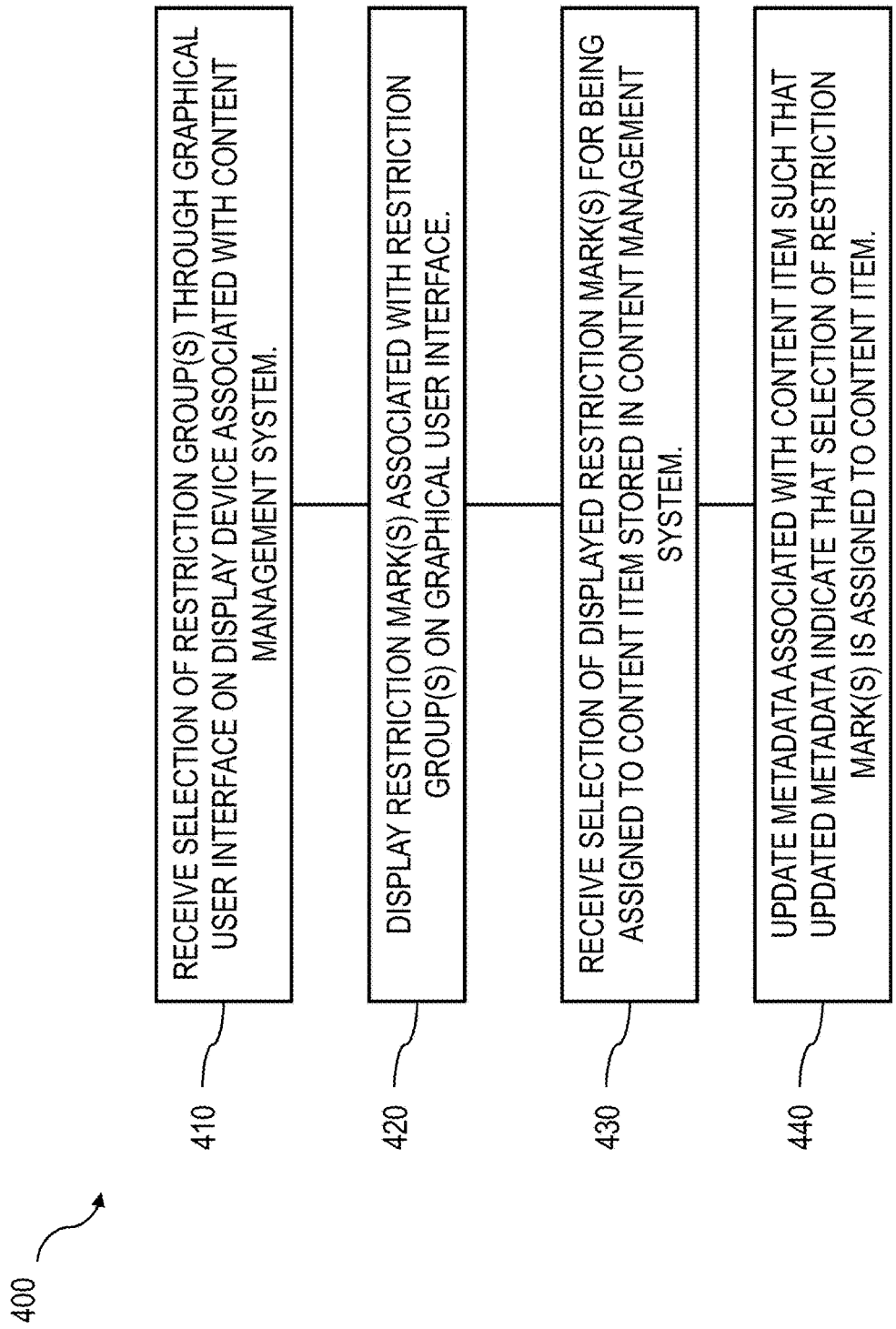
FIG. 4 shows a process flow diagram illustrating aspects of a method having one or more features consistent with the present description.

FIG. 4 it was trading features that can be included in a method consistent with implementations of the current subject matter. Some or all of the elements depicted in FIG. 4 can be omitted or otherwise altered or changed in sequence from what is presented without deviating from the scope of the current subject matter. At 410, a selection of one or more restriction groups is received through a graphical user interface on a display device associated with a content management system. It will be understood that the content management system can include records management features in addition to or instead of content management system features. At 420, one or more restriction marks associated with the one or more restriction groups are displayed on the graphical user interface on the display device. A selection of the displayed one or more restriction marks for being assigned to a content item stored in the content management system is received at 430 through the graphical user interface. The content item has associated metadata stored in the content management system. At 440, metadata associated with the content item are updated, such that the updated metadata indicate that the selection of the one or more restriction marks is assigned to the content item.

The user interface view examples shown in FIG. 5 through FIG. 18 provide various examples, which are not intended to be limiting, illustrating features that can be included in approaches consistent with implementations of the current subject matter.

Figure 5:
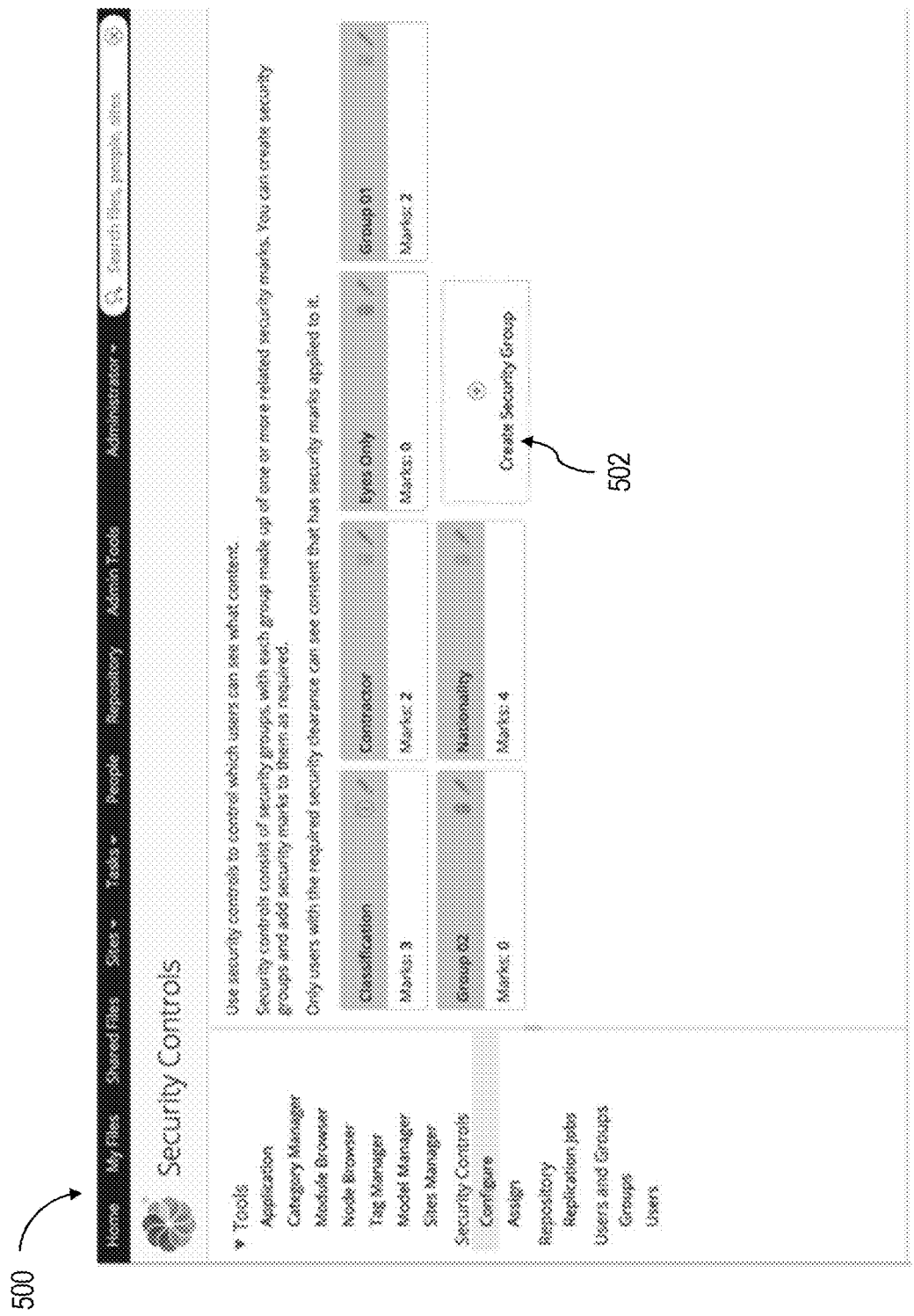
FIG. 5 through FIG. 18 show views illustrating example features of a user interface consistent with implementations of the current subject matter.

FIG. 5 illustrates an example of a user interface view 500 that includes features relating to setting of security controls into restriction groups consistent with implementations of the current subject matter. Some or all of these features may be presented as part of a group creation view 125 as discussed above in reference to FIG. 1. Security controls applied to an end user 115 can dictate what content items and/or other information the end user 115 is able to see. Such information can include metadata, file names, security controls, size information, usage information, or the like. These security controls can be more readily managed via designation of user configurable restriction groups that each include a set of restriction markings that are typically used applied together to a variety of content items. The user interface view 500 can be configured to facilitate generation of restriction groups. The restriction groups illustrated in FIG. 5 include a "Classification" group, a "Contractor" group, an "Eyes Only" group, a "Nationality" group, and other groups. A system manager 105 having proper access permissions can assign a name or other label to each restriction group and can also manage the security or restriction markings included within the restriction groups. In some variations, the name chosen may reflect an intended purpose for that group. For example, a "Nationality" restriction group may be a restriction group for a particular nationality where only citizens of a particular nationality or group of nationalities can access particular content items and/or information about such content items.

Each restriction group can include one or more security or other restriction marks. The restriction marks of a restriction group can dictate whether a content item assigned with that restriction group is made available to an end user 115. For example, only an end user 115 having permissions levels and/or other security-related characteristics that are sufficient to satisfy all of the restrictions specified by the restriction group my access the content item (or file hierarchy structure, etc.). As noted above it is optional to include limited access as defined by a restriction group to allow an end user 115 without access to a content item or the like to nonetheless be able to "discover" the content item or the like without being able to open it or perform any other actions on it.

The user interface view 500 of FIG. 5 can facilitate a system manager 105 to create a new restriction group. A portion 502 of the user interface 500 can include an instruction to create a new restriction group. A system manager 105 can interact with that portion 502 to cause one or more input interface portions to be presented to the system manager 105 within the user interface 500.

Figure 6:
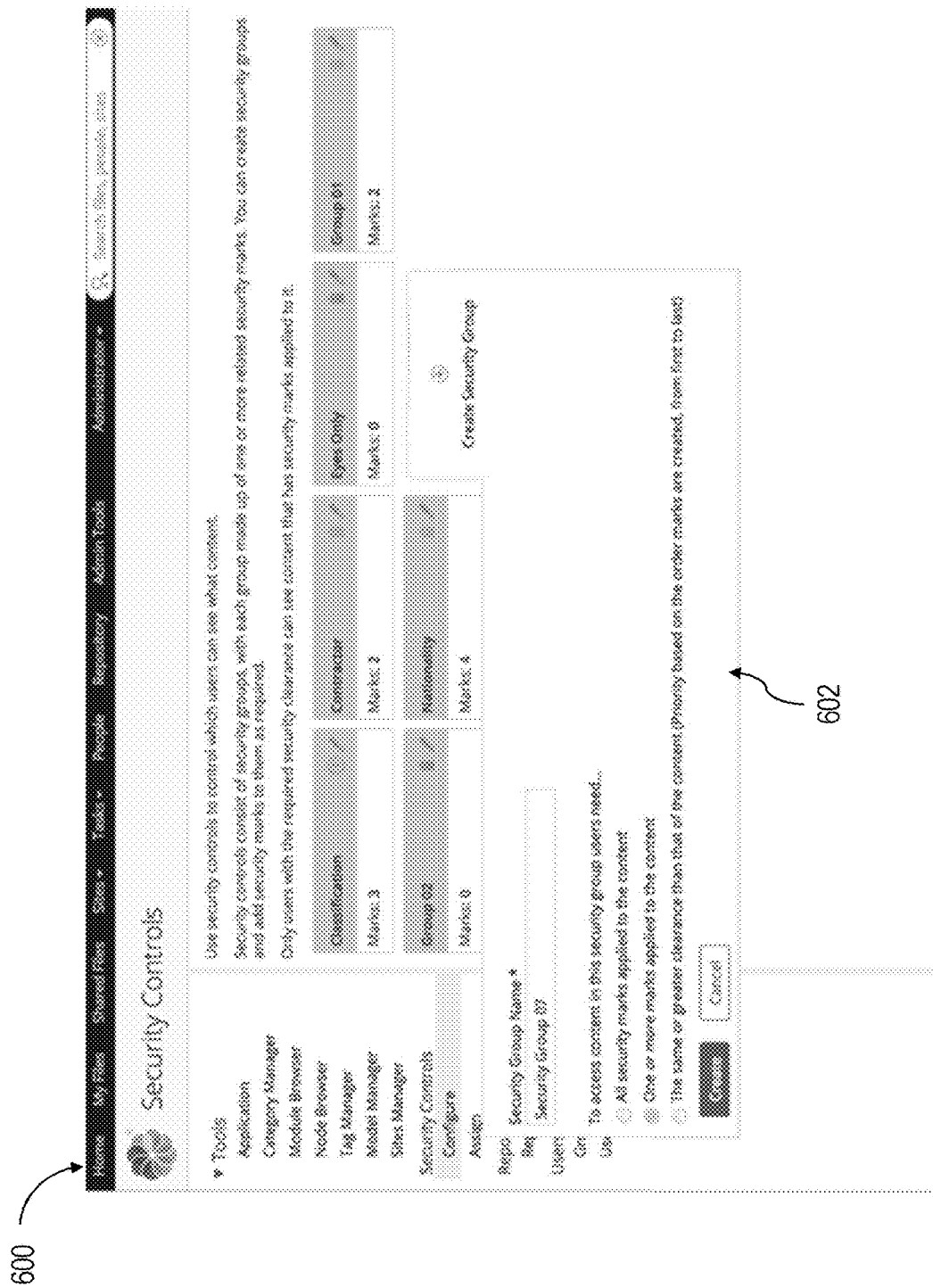

FIG. 6 illustrates an example of a user interface 600 which can support one or more additional functions discussed above in reference to the group creation view 125. An input interface portion 602 can be included for presenting to the system manger 105 in response to the system manger 105 interacting with the portion of the user interface 600 for creating a new security group. The input interface portion 602 can be configured to facilitate entry of a name for the new restriction group. The input interface portion 602 can be configured to allow a system manager to select one or more access grant options based on one or more restriction marks associated with the security group. For example, the security administrator can select whether all restriction marks, one restriction mark, or the like, associated with a restriction group must be satisfied by a user before they can access the content to which a restriction group has been assigned. The security administrator can select whether users with the same or greater clearance level as the restriction marks in the restriction group can access the content to which the restriction group has been assigned.

Figure 7:
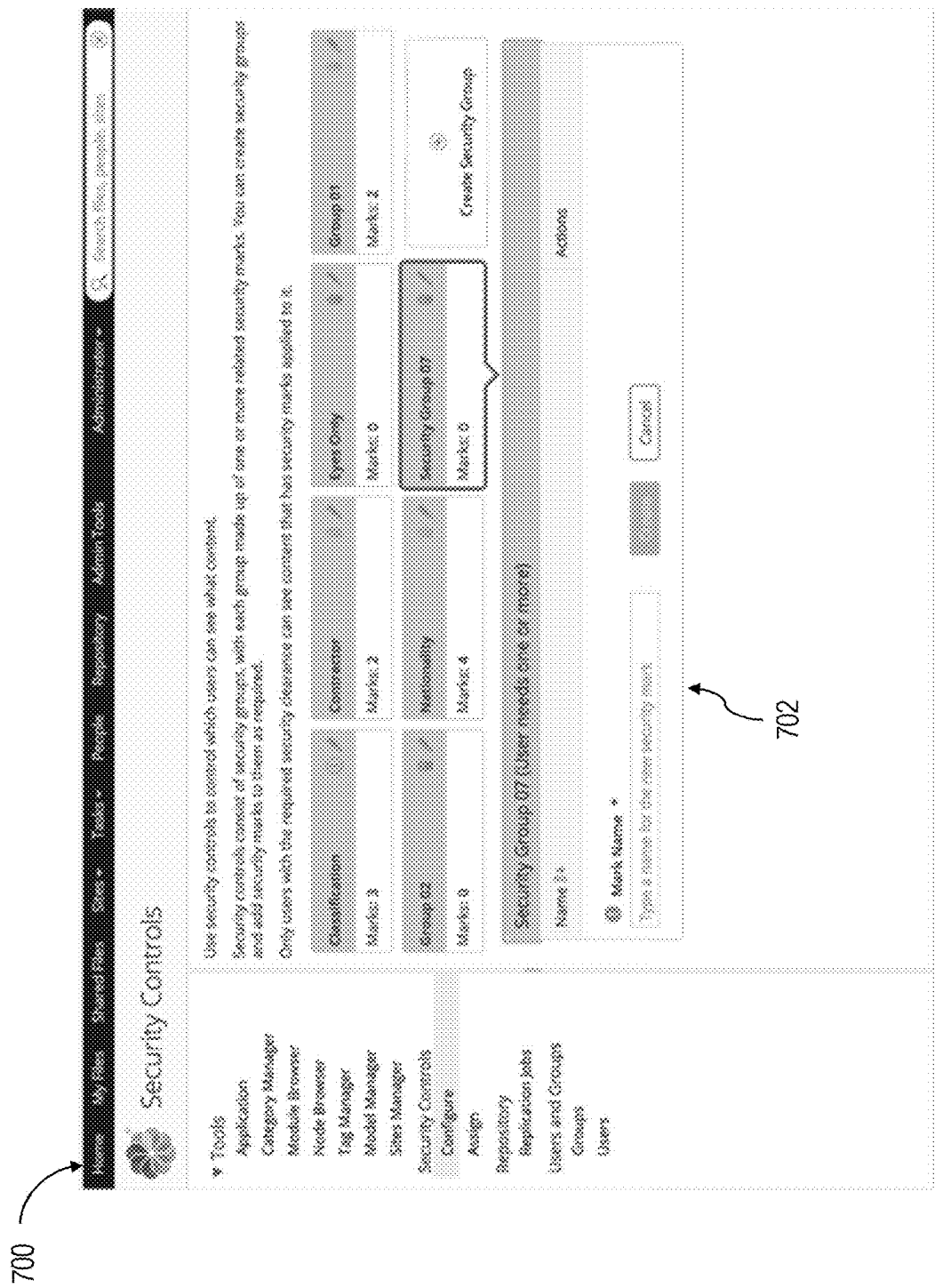

FIG. 7 is an illustration of a user interface 700 having one or more features representative of those summarized above in regard to the group creation view 120. In response to creating a new restriction group a restriction mark assignment interface portion 702 can be presented to the system manager 105. The restriction mark assignment interface portion 702 can also be presented to the security administrator in response to an input from the security administrator indicating that the system manager desires to edit the restriction marks associated with a restriction group. The restriction mark assignment portion 702 can facilitate entry of a restriction mark identity or name.

Figure 8:
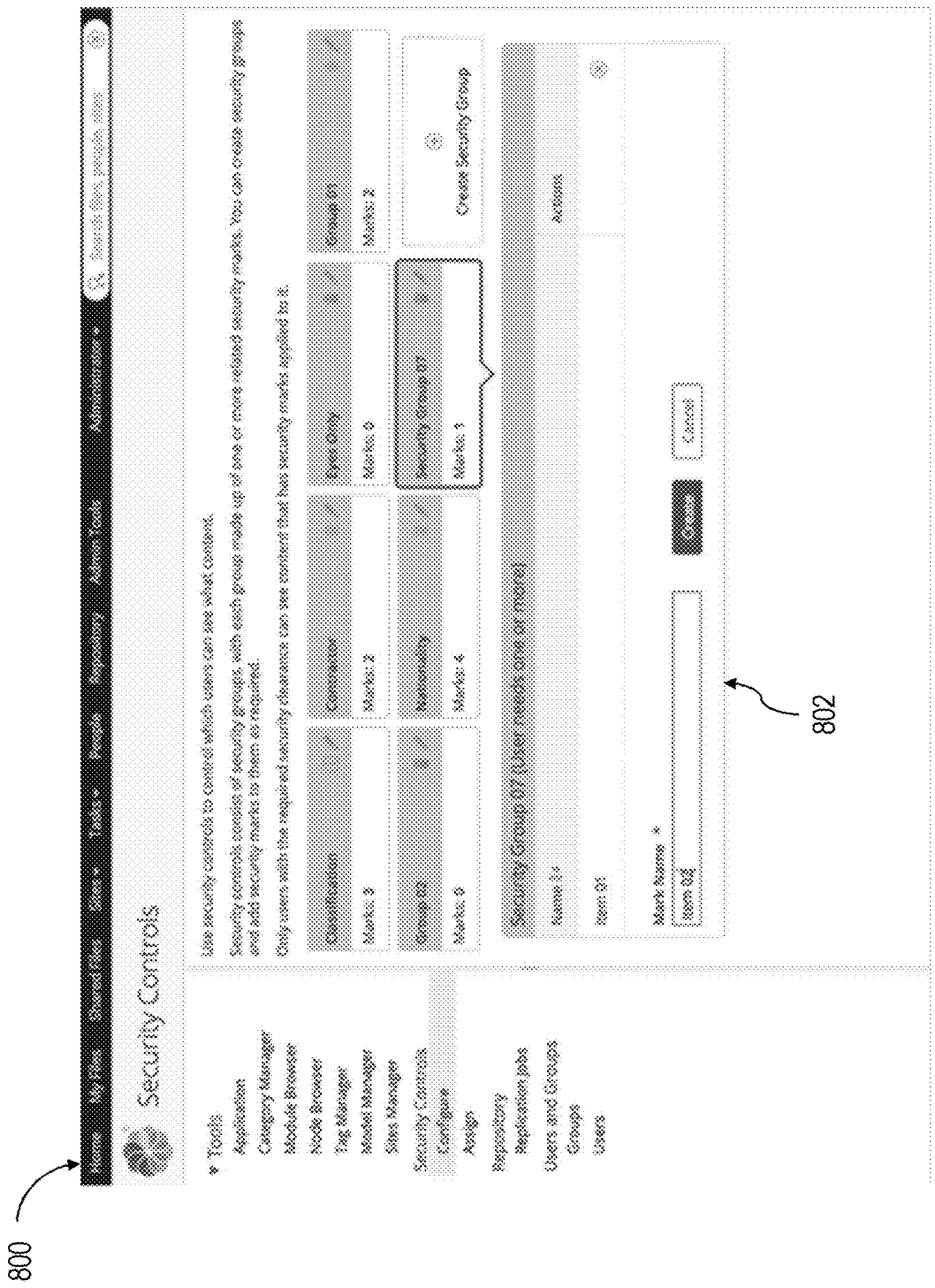

FIG. 8 is an illustration of a user interface 800 having one or more features related to the group creation view 120 discussed above. The user interface 800 can include a restriction mark assignment portion 902. The restriction mark assignment portion 800 can be similar to the restriction mark assignment portion 702. The restriction mark assignment portion 802 can be configured to facilitate assignment of additional restriction marks to the restriction group.

Figure 9:
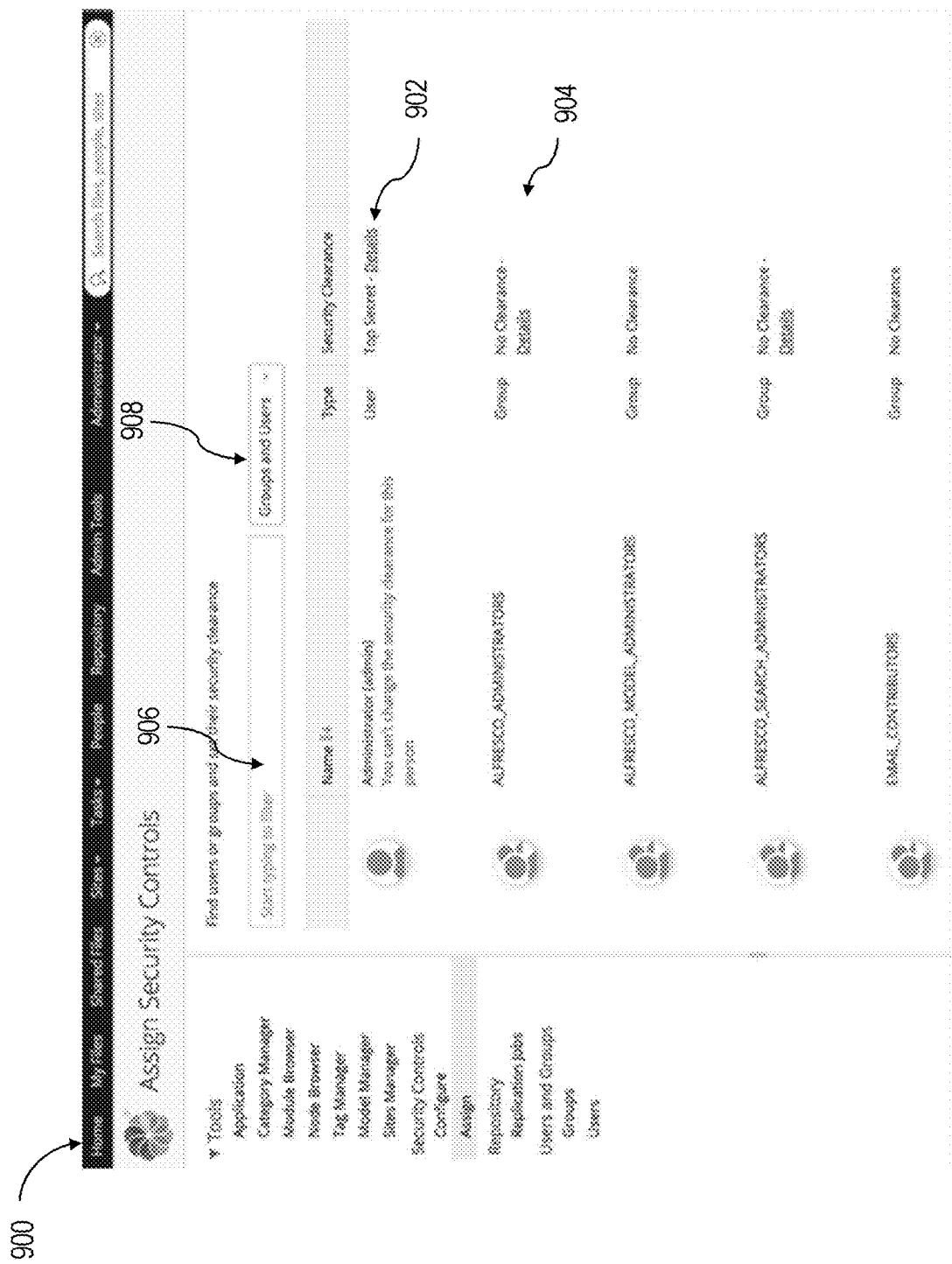
Figure 10:
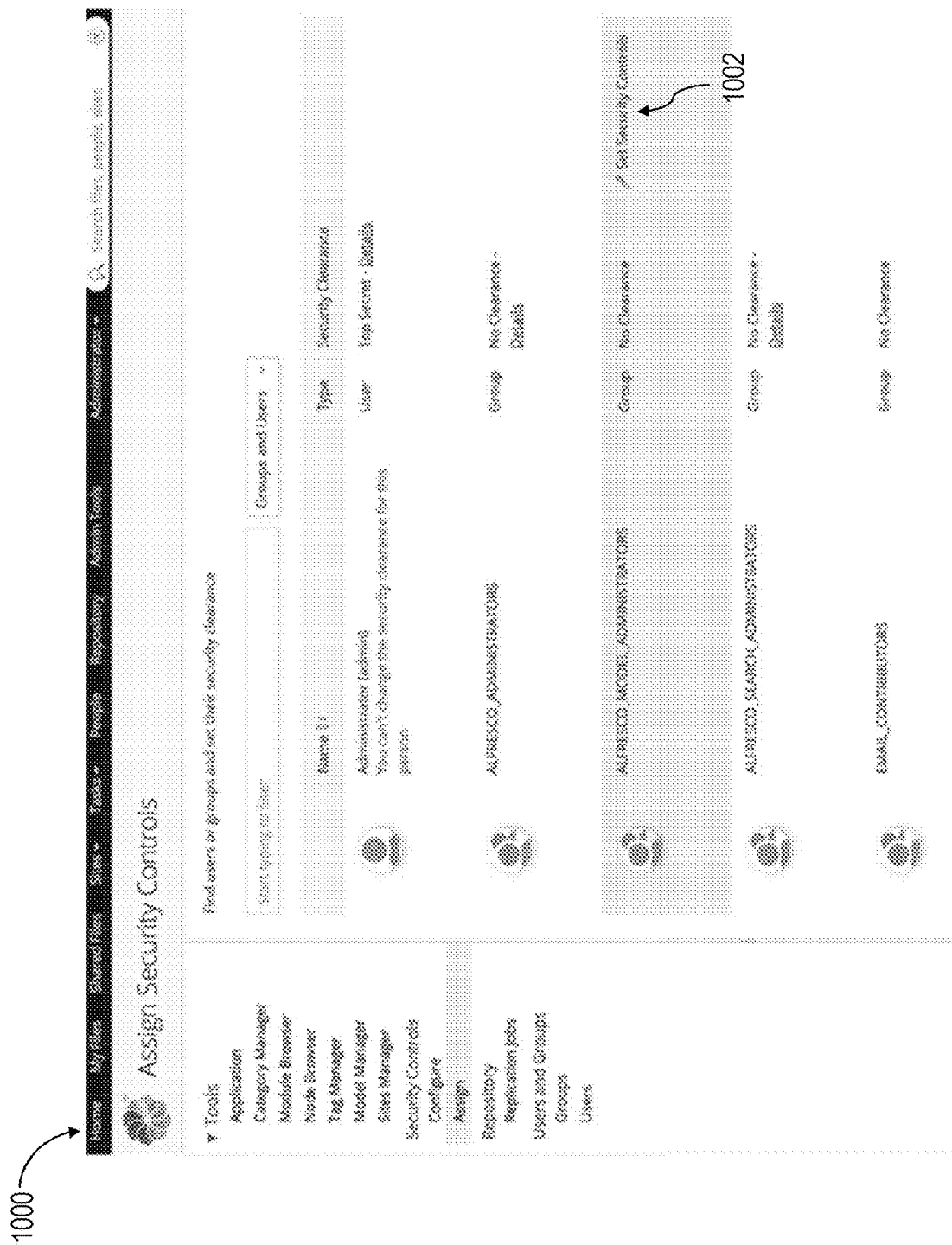

A user interface can be provided that facilitates assignment of security controls to users or groups of users. FIG. 9 is an illustration of a user interface 900 having one or more features consistent with the group editing view 130 and the mark assignment view 130 discussed above. The user interface 900 can be configured to facilitate assignment of security controls to users 902 or groups of users 904 by a security officer 110. The user interface 900 can include a text box 906 allowing entry of text to facilitate filtering of the users or groups. The user interface 900 can include a dropdown menu 908 to allow filtering based on categories. FIG. 10 is an illustration of a user interface 1000 having one or more features related to the group editing view 130. The user interface 1000 can include an input 1002 that causes an input box to appear to allow a security officer 110 to edit security controls of a user and/or group of users.

Figure 11:
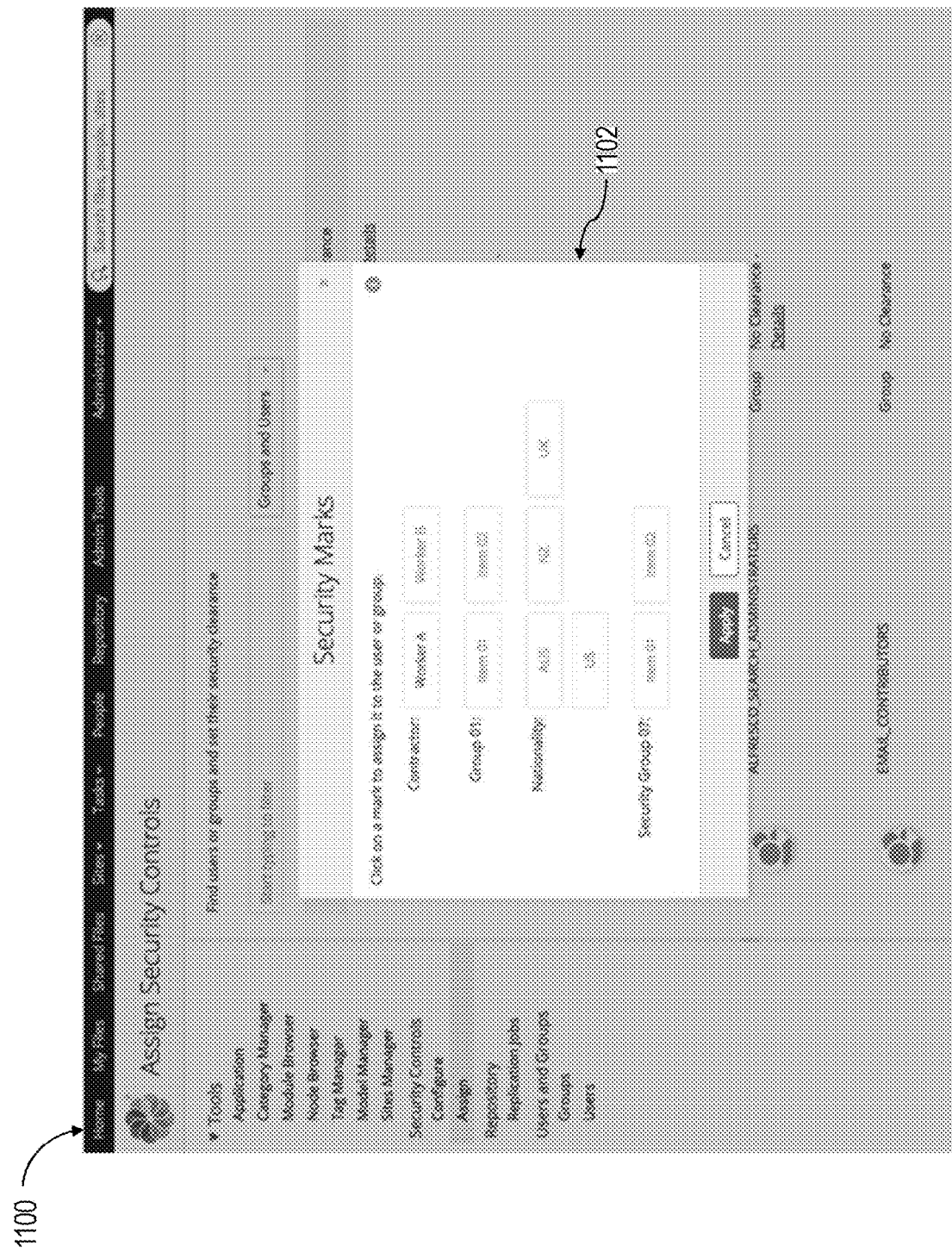

FIG. 11 is an illustration of a user interface 1100 having one or more features relating to the group editing view 130 and the mark assignment view 135. The user interface 1100 can include an input interface 1102. The input interface 1102 can be presented to a security officer 110 in response to an input by the security officer 110 providing an indication that the security officer 110 desires to edit security controls of a user and/or group of users. The input interface 1102 can be a restriction mark selection interface. The input interface 1102 can facilitate selection of one or more restriction marks to assign to a user and/or group of users. The input interface 1102 can include an indication of one or more restriction groups. The input interface 1102 can include an indication of one or more restriction marks associated with the one or more restriction groups. The one or more restriction groups and/or the one or more restriction marks can be security groups and/or restriction marks defined by a security officer and/or a system manger 110 via one or more of user interfaces 500, 600, 700, 800, or the like.

Figure 12:
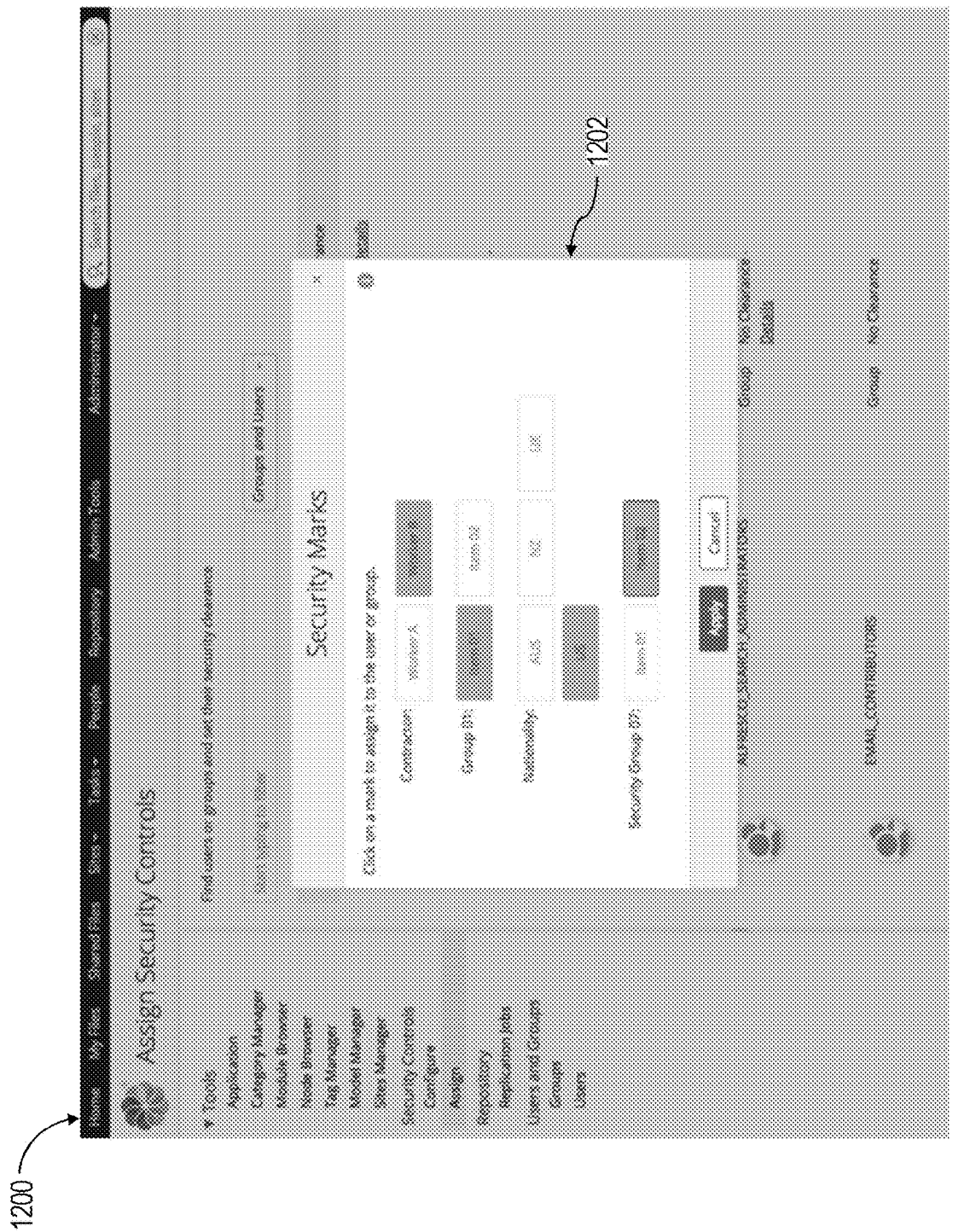

FIG. 12 illustrates a user interface 1200 having one or more features relating to the group editing view 125 and/or the mark assignment view 135. The user interface 1200 can include an input portion 1202 facilitating selection of one or more restriction marks to assign to a user and/or group of users. The input portion 1202 can include one or more radio buttons associated with a restriction mark and/or restriction group. The one or more radio buttons, when interacted with by the security officer 110, can change appearance to provide an indication that the restriction mark, associated with the radio buttons, have been selected.

Figure 13:
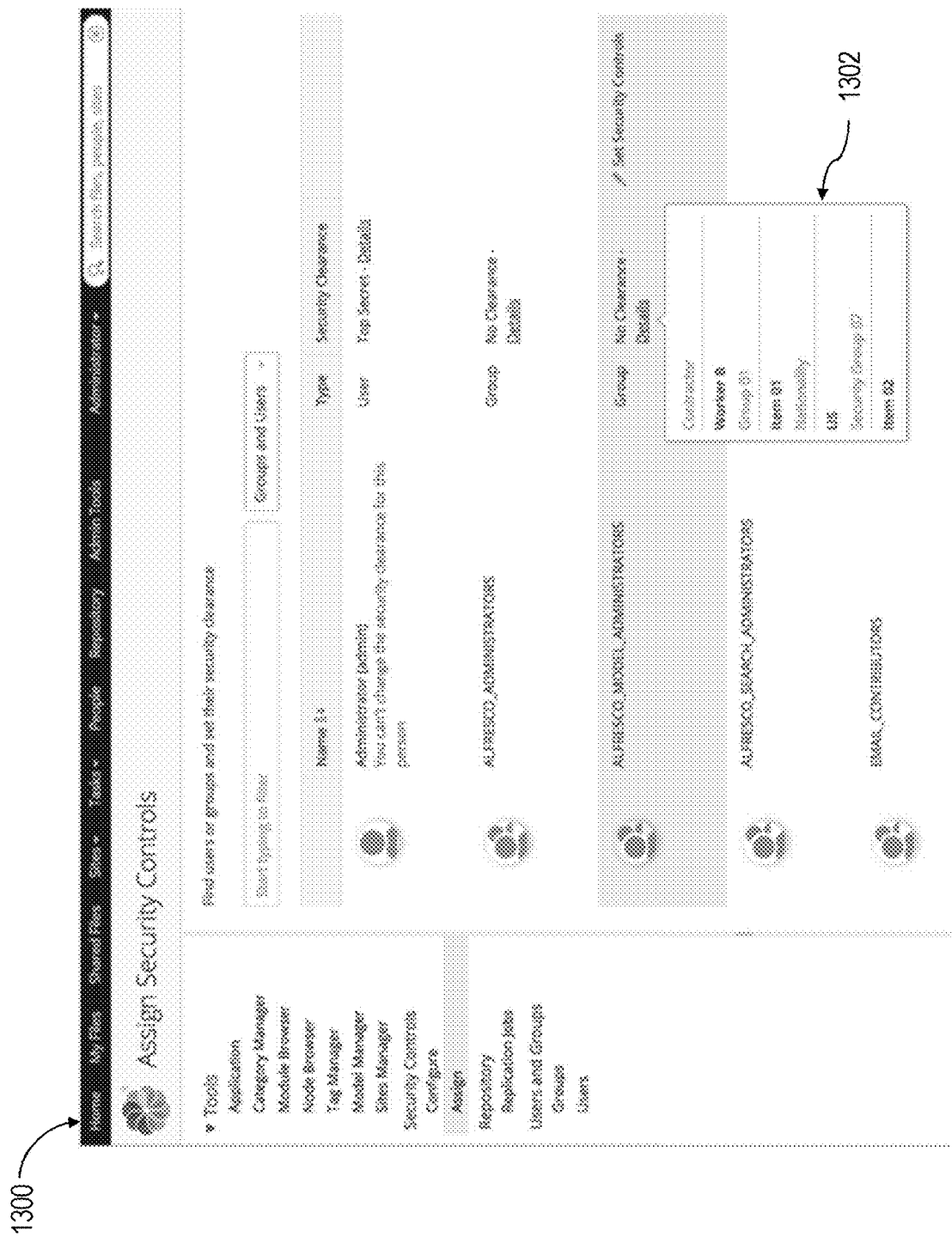

FIG. 13 is an illustration of a user interface 1300 having one or more features relating to the clearance view 140 (which can also be referred to as a security controls assignment view). The user interface 1300 can be similar to user interface 1000 and/or 1100. The user interface 1300 can include an information interface portion 1302. The information interface portion 1302 can be presented to a security officer 110 in response to an interaction with one or more elements of the user interface 1300. For example, in response to a security officer 110 interacting with a "Details" link or portion, of the user interface 1300, associated with a particular user and/or group of users, the information interface portion 1302 can be presented. The information interface portion 1302 can include information associated with the user and/or group of users. For example, the information interface portion 1302 can include an indication of the restriction marks and/or restriction groups that have been assigned to the user.

Figure 14:
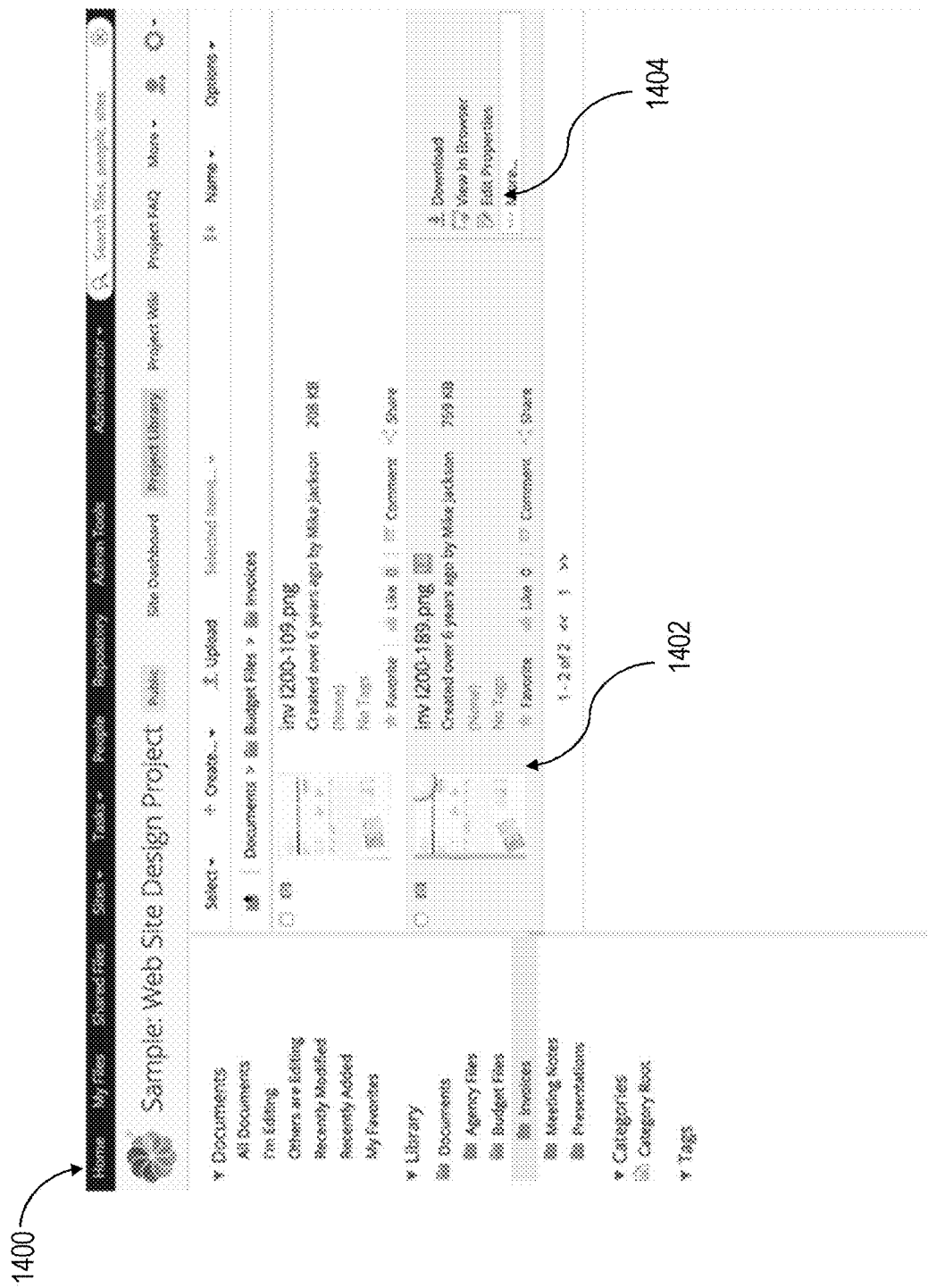

FIG. 14 is an illustration of a user interface 1400 having one or more elements consistent with the present description. The user interface 1400 can be configured to facilitate selection of a document and/or set of documents 1402, by an end user 115 having sufficient clearance or permission levels for the content items being manipulated. The content item and/or content items 1402 can be selected to facilitate assignment of one or more restriction marks to the content item and/or content items. One or more options 1404 may be presented in the user interface 1400. The one or more options 1404 can facilitate one or more actions associated with the content item and/or content items 1402. The one or more options 1404 may include a dropdown menu displaying more options than presented in a standard view of the user interface 1400. The standard view of the user interface 1400 can present the most used options.

Figure 15:
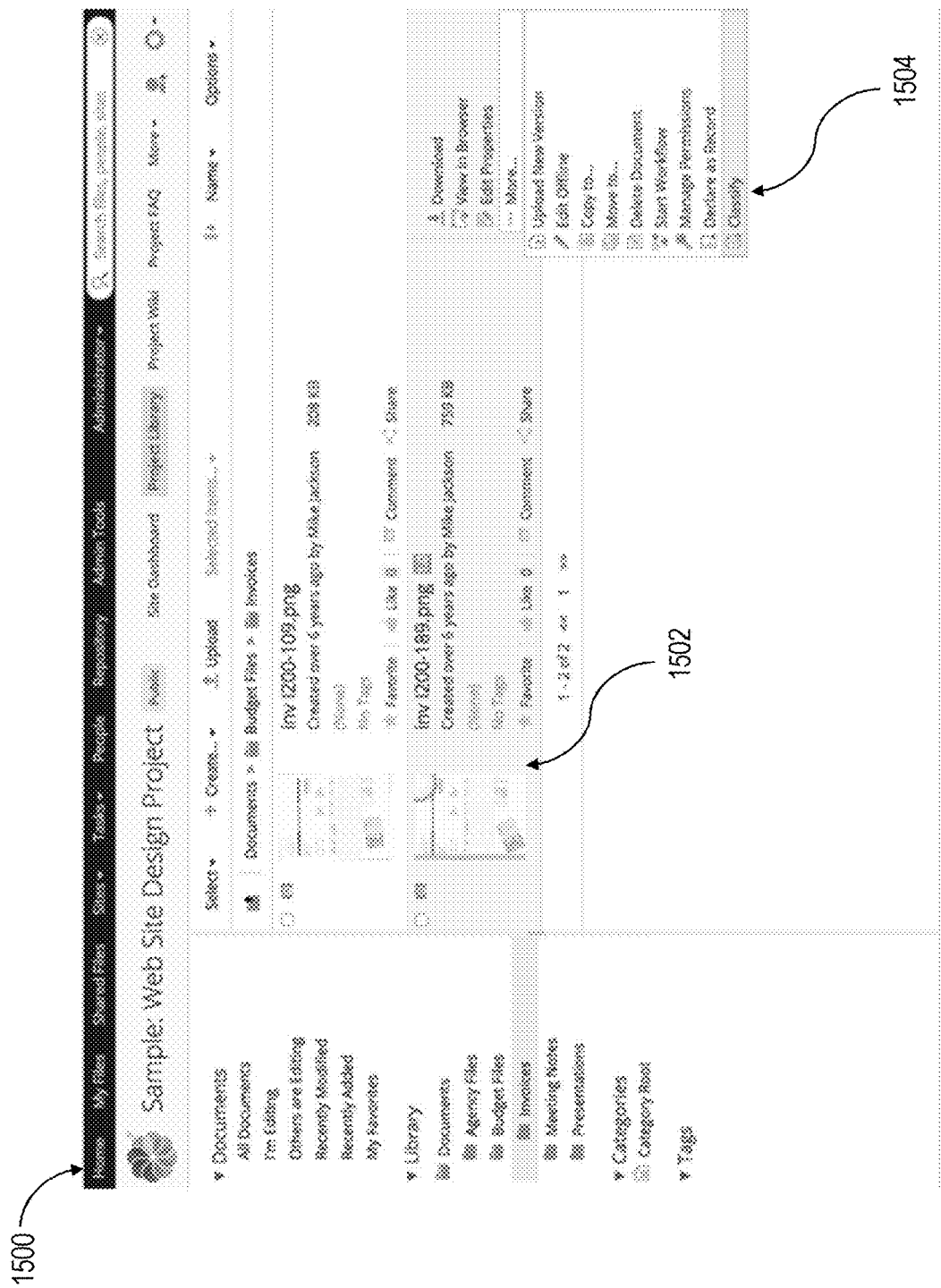

FIG. 15 is an illustration of a user interface 1500 having one or more elements consistent with the present description. Drop down option menu 1504 associated with content item and/or content items 1502 can include a "classify" option. The presentation of the "classify" option can be limited to those users having a restriction mark associated with them that indicates that they have the permission to classify documents and/or sets of documents. The presentation of the "classify" option can be limited to those users having a restriction mark associated with them that indicates that they have permission to view the content item and/or sets of content items.

The user interface 1400 of FIG. 14 and the user interface 1500 of FIG. 15 can include a preview of the content item and/or content items. The preview of a content item can include a thumbnail of one or more pages of the content item. For example, a thumbnail of the first page of a document can be presented.

Figure 16:
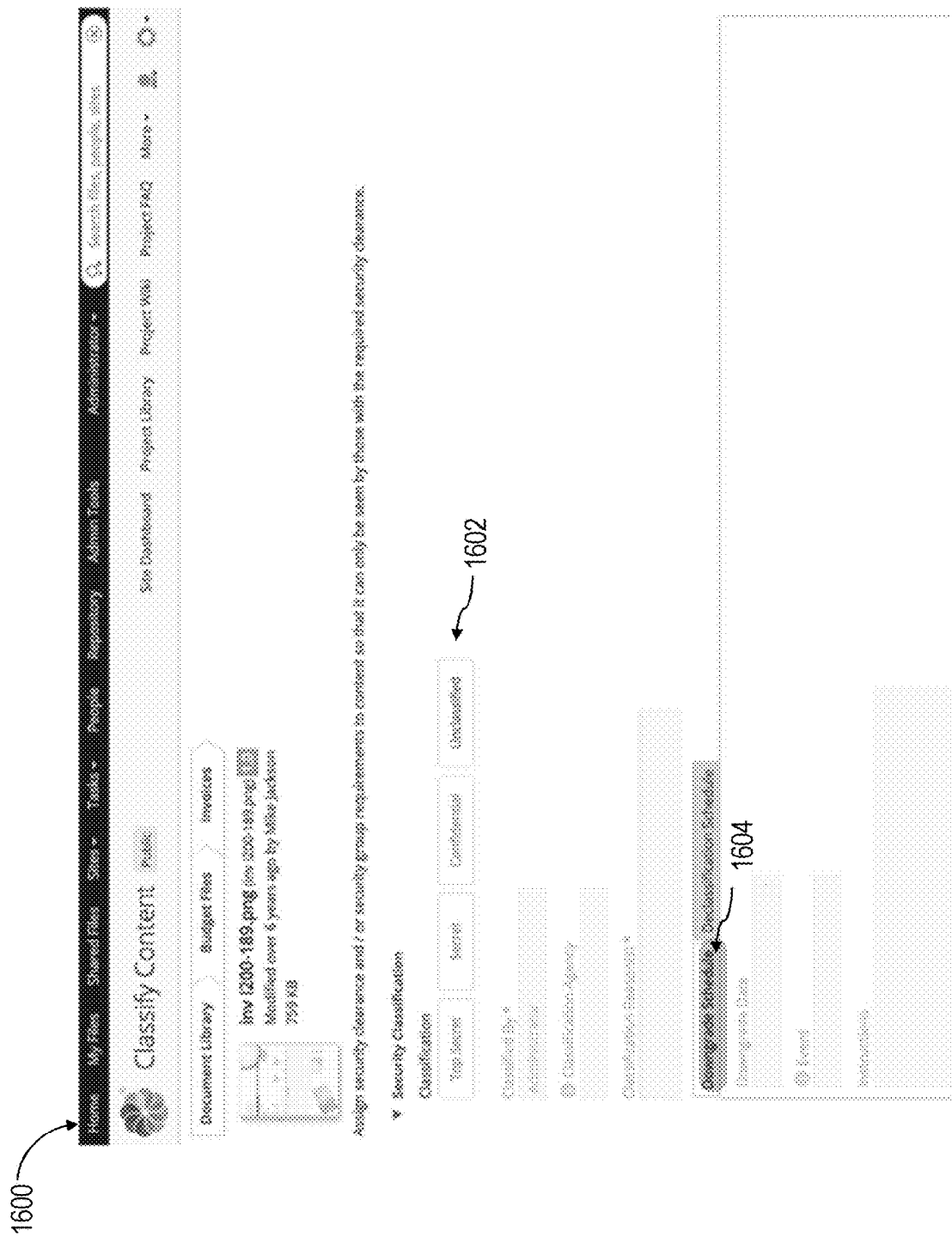

In response to a user selecting to classify a document and/or set of documents, a user interface can be presented facilitating the selection and/or entry of content item and/or content items marks and/or content item and/or content items options for the content item and/or content items. FIG. 16 illustrates a user interface 1600 having one or more features consistent with the present description. User interface 1600 can be presented to a system administrator in response to an input from the system administrator interacting with the "Classify" option associated with a content item and/or content items.

The user interface 1600 can facilitate assignment of restriction marks and/or restriction group requirements to content items of a content management system. Assigning restriction marks and/or restriction group requirements to content items ensures that only those with the correct restriction mark and/or restriction group can view the content items, thereby preserving the security of content items. The user interface 1600 can facilitate selection of one or more security classifications 1602. For example, security classifications can include "unclassified," "confidential," "secret," "top secret," or the like. Content items within a content management system can be classified using security classifications in addition to having restriction marks. In such situation, even if a user has been assigned a security classification that is the same as, or greater than, the security classification assigned to a content item, the user may not be able to see the content item because they do not have the correct restriction marks in addition to the correct security classification.

The user interface 1600 can facilitate defining, by a security officer, of a downgrade schedule 1604. A downgrade schedule 1604 can facilitate downgrading of the security classification of a content item over time. Some content items will never be downgraded; others will follow a downgrade schedule. The downgrade schedule 1604 portion of the user interface 1600 can facilitate selection of a date on which the content item will be downgraded. The downgrade schedule 1604 portion of the user interface 1600 can facilitate selection of an event which, when it occurs, will cause the security classification of the content item to downgrade.

Figure 17:
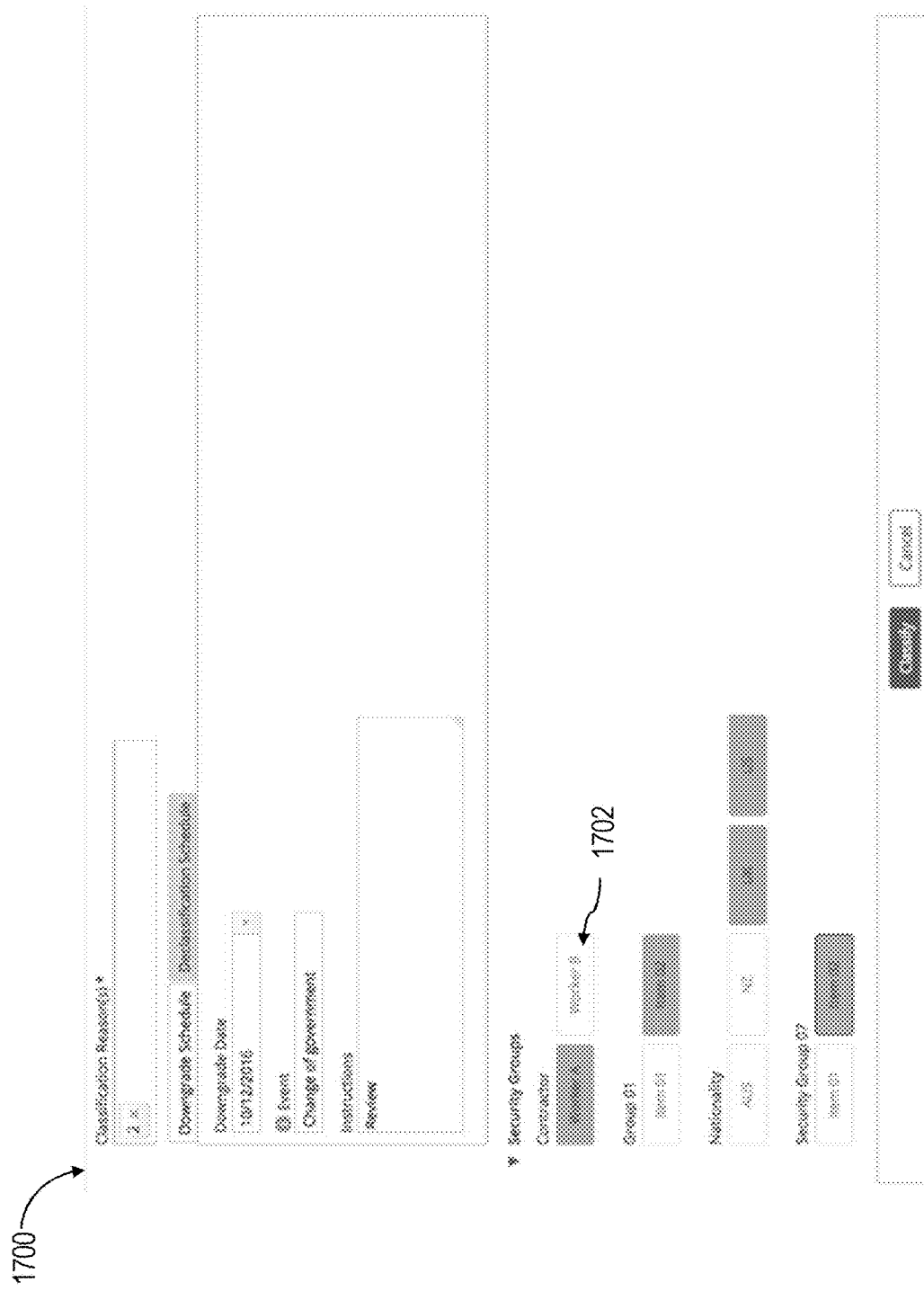

FIG. 17 illustrates a user interface 1700 having one or more features consistent with the present description. The user interface 1700 can be configured to facilitate selection of one or more restriction groups and/or one or more restriction marks 1702 to associate with the content item. In some variations, the user interface 1700 can include one or more interactive elements associated with the restriction groups and/or restriction marks generated by the security officer and/or system manager through user interface 600, 700, 800, 900, or the like. In the example, illustrated in FIG. 17, the content item has assigned to it one or more restriction marks requiring a user to have, before being granted access to the content item, a "Worker A" security mark, an "Item 02" restriction mark from restriction group "Group 01," one or more of a "UK" restriction mark and a "US" restriction mark, and restriction mark "Item 02" from restriction group "Security Group 07."

Figure 18:
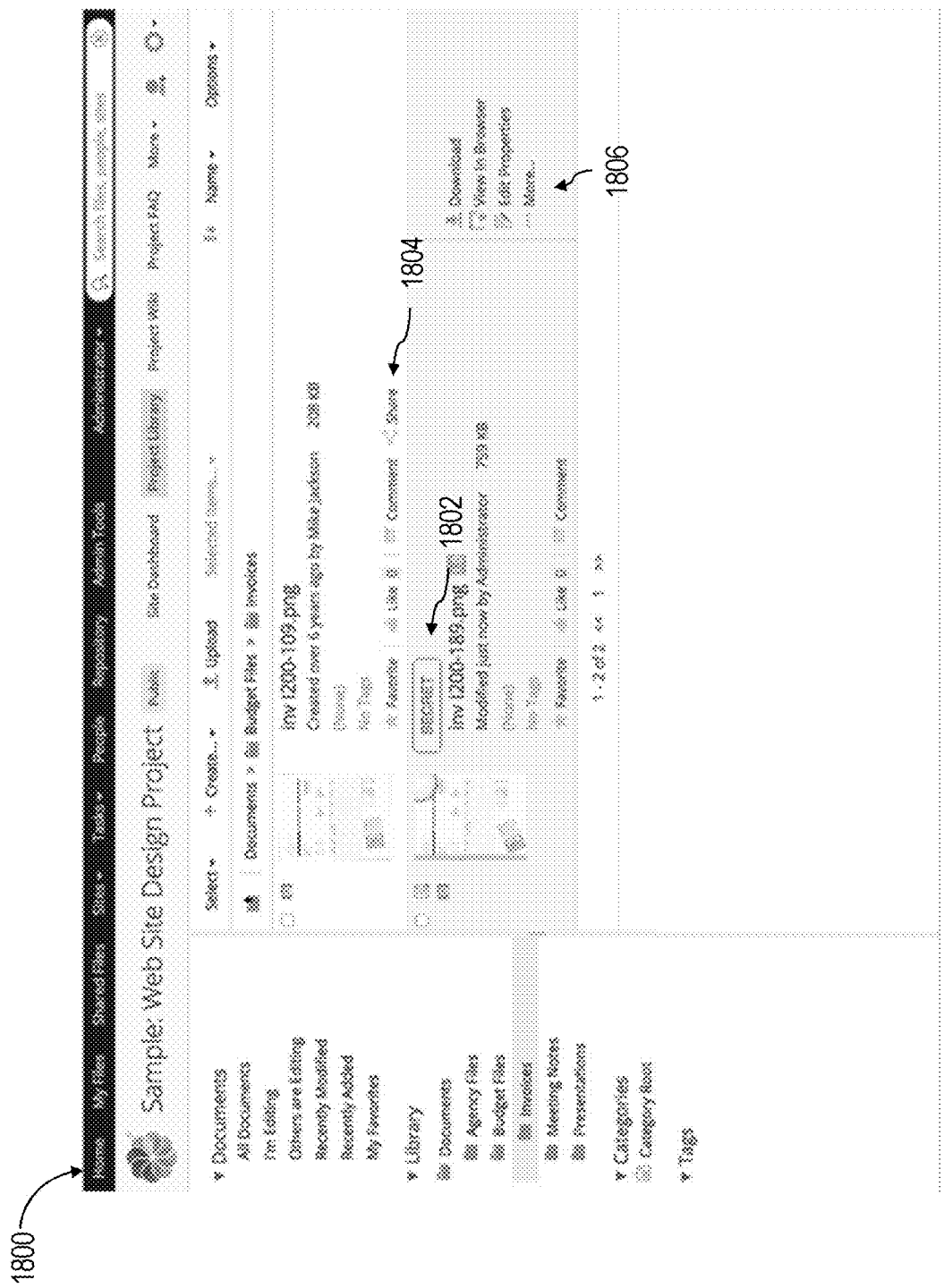

A user interface can be provided that facilitates searching of content items in a content management system. FIG. 18 is an illustration of a user interface 1800 having one or more features consistent with the present description. The user interface 1800 can include an indication 1802 of the security classification assigned to a content item. If a user does not have a security classification and/or security marks that match or exceed the security classification and/or security marks of the content item, the content item may not be displayed to the user in the user interface 1800. Content items that do not have security classifications may be shared. The user interface 1800 may include a share option 1804 which, when interacted with by the user, facilitate sharing the content item with one or more other users of a content management system, third party users, or the like.

The user interface 1800 can facilitate editing of the security classification and/or security marks assigned to a content item. The user interface 1800 can include a drop-down menu 1806 that can include an option to edit the classification of a content item.

In some variations, only those users having a particular security classification, that belong to a particular security group, or has a particular security mark, can assign that security classification, security group or security mark to a content item. Users who do not belong to a security group, or has a security mark may be prohibited from assigning that security classification, security group or security mark to a content item. In some variations, users who do not belong to a security group, or has a security mark may be prohibited from viewing the existence of that security classification, security group or security mark.

The user interface(s) described herein can be presented on a display of a computer device. A user can interact with the user interface(s) described herein through one or more input devices associated with then display. Input devices can include peripheral devices of a computer device. Input devices can include a touchpad, touchscreen, keyboard, mouse, or the like.

Implementations of the current subject matter can include, but are not limited to, methods consistent with the descriptions provided above as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claim.

What is claimed is:

1. A computer-implemented method comprising:
providing one or more restriction groups in a content management system;
associating one or more restriction marks with the one or more restriction groups, at least a first restriction mark being associated with a first restriction group;
assigning the first restriction mark to a first content item stored in the content management system, in response to determining that the first content item is associated with the first restriction group, the first content item being associated with metadata indicating user access permissions according to the first restriction mark and a security classification;
updating the metadata associated with the first content item based on the assignment of the first restriction mark to the first content item to allow or limit user access to the first content item; and
updating the metadata associated with the first content item to further allow or limit user access to the first content item, in response to determining that the security classification is updated.

2. The method of claim 1, wherein the security classification is updated due to passage of time.

3. The method of claim 2, wherein the security classification is updated to provide a number of users with access to the first content after a threshold time period has passed.

4. The method of claim 2, wherein the security classification is updated to provide a first set of users, having a first security clearance level, with access to the first content, during a first time period.

5. The method of claim 4, wherein the security classification is updated to in addition provide a second set of users, having a second security clearance level, with access to the first content, during a second time period.

6. The method of claim 1, wherein in response to a search query by a first user, the first content item is excluded from a list of results generated for viewing by the first user, when the first content item matches the query and the first content item does not match the user's security classification.

7. The method of claim 1, wherein in response to a search query by a first user, the first content item is excluded from a list of results generated for viewing by the first user, when the first content item matches the query and the first restriction mark is not assigned to the first content item.

8. The method of claim 1, wherein in response to a search query by a first user, the first content item is excluded from a list of results generated for viewing by the first user, when the first content item matches the query and the first content item either does not match the user's security classification or the first restriction mark is not assigned to the first content item.

9. The method of claim 1, further comprising:
receiving, through a graphical user interface on a display device, a selection of a plurality of users of the content management system; and
receiving, through the graphical user interface on the display, a selection of one or more restriction marks; and
assigning, by the content management system, the one or more restriction marks to the selection of the plurality of users.

10. The method of claim 9, further comprising:
receiving, through the graphical user interface on the display device, a selection of a restriction classification of a set of restriction classifications; and
assigning, by the content management system, the selected restriction classification to a content item stored in the content management system.

11. A computer-implemented system comprising:
at least one processor;
at least one memory configured to store machine-readable instructions, which, when executed by the at least one processor, cause the at least one processor to perform one or more operations, the one or more operations comprising:
receiving, through a graphical user interface on a display device associated with a content management system, a selection of one or more restriction groups, at least a first restriction mark being associated with a first restriction group;
assigning the first restriction mark to a first content item stored in the content management system, in response to determining that the first content item is associated with the first restriction group, the first content item being associated with metadata indicating user access permissions according to the first restriction mark and a security classification;
displaying, on the graphical user interface on the display device, one or more restriction marks associated with the one or more restriction groups;
receiving, through the graphical user interface on the display, a selection of the displayed one or more restriction marks for being assigned to a content item stored in the content management system, the content item having associated metadata stored in the content management system; and
updating metadata associated with the content item, the updated metadata indicating that the selection of the one or more restriction marks is assigned to the content item.

12. The system of claim 11, wherein the one or more operations further comprise:
receiving, through the graphical user interface on the display, the selection of the one or more restriction marks for assigning to a user of the content management system, the content item managed by the content management system; and
updating a profile associated with the user, to include the one or more restriction marks.

13. The system of claim 12, wherein the one or more operations further comprise:
receiving a request, at the content management system and from the user, to access the content item;
comparing, by the content management system, the one or more restriction marks indicated in the metadata associated with the content item with the one or more restriction marks in the profile of the user; and
granting the user access to the content item in response to the comparing revealing that the one or more restriction marks in the profile of the user satisfy the one or more restriction marks in the metadata associated with the content item.

14. The system of claim 13, wherein the one or more operations further comprise:
receiving, through the graphical user interface on the display device, a selection of a plurality of users of the content management system; and
receiving, through the graphical user interface on the display, a selection of one or more restriction marks; and
assigning, by the content management system, the one or more restriction marks to the selection of the plurality of users.

15. The system of claim 11, wherein the one or more operations further comprise:
receiving, through the graphical user interface on the display device, a selection of a restriction classification of a set of restriction classifications; and
assigning, by the content management system, the selected restriction classification to the content item stored in the content management system.

16. A non-transitory computer readable storage media for storing instruction, wherein execution of the instruction by one or more processors causes a computer to:
provide one or more restriction groups in a content management system;
associating one or more restriction marks with the one or more restriction groups, at least a first restriction mark being associated with a first restriction group;
assign the first restriction mark to a first content item stored in the content management system, in response to determining that the first content item is associated with the first restriction group, the first content item being associated with metadata indicating user access permissions according to the first restriction mark and a security classification;
update the metadata associated with the first content item based on the assignment of the first restriction mark to the first content item to allow or limit user access to the first content item; and
update the metadata associated with the first content item to further allow or limit user access to the first content item, in response to determining that the security classification is updated.

17. The computer readable storage media of claim 16, wherein the security classification is updated due to passage of time.

18. The computer readable storage media of claim 17, wherein the security classification is updated to provide a larger number of users with access to the first content after a threshold time period has passed.

19. The computer readable storage media of claim 17, wherein the security classification is updated to provide a first set of users, having a first security clearance level, with access to the first content, during a first time period.

20. The computer readable storage media of claim 19, wherein the security classification is updated to in addition provide a second set of users, having a second security clearance level, with access to the first content, during a second time period.

\* \* \* \* \*